US010647788B2

(12) United States Patent
Chen et al.

(10) Patent No.: US 10,647,788 B2
(45) Date of Patent: May 12, 2020

(54) SELF-LIMITING CATALYST SYSTEM WITH CONTROLLED ALUMINUM TO SCA RATIO AND METHOD

(75) Inventors: Linfeng Chen, Sugar Land, TX (US); Richard E. Campbell, Jr., Midland, MI (US); Jan W. Van Egmond, Charleston, WV (US)

(73) Assignee: W. R. Grace & Co-.Conn., Columbia, MD (US)

( * ) Notice: Subject to any disclaimer, the term of this patent is extended or adjusted under 35 U.S.C. 154(b) by 0 days.

(21) Appl. No.: 12/674,468

(22) PCT Filed: Aug. 21, 2008

(86) PCT No.: PCT/US2008/073882
§ 371 (c)(1),
(2), (4) Date: Feb. 22, 2010

(87) PCT Pub. No.: WO2009/029487
PCT Pub. Date: Mar. 5, 2009

(65) Prior Publication Data
US 2011/0152067 A1   Jun. 23, 2011

Related U.S. Application Data

(60) Provisional application No. 60/957,888, filed on Aug. 24, 2007.

(51) Int. Cl.
*C08F 10/06* (2006.01)
*C08F 10/02* (2006.01)
*B01J 8/18* (2006.01)
*C08F 210/06* (2006.01)
*C08F 110/06* (2006.01)

(52) U.S. Cl.
CPC ............. *C08F 10/02* (2013.01); *B01J 8/1809* (2013.01); *B01J 8/1872* (2013.01); *C08F 10/06* (2013.01); *C08F 110/06* (2013.01); *C08F 210/06* (2013.01); *C08F 2400/02* (2013.01)

(58) Field of Classification Search
None
See application file for complete search history.

(56) References Cited

U.S. PATENT DOCUMENTS

| | | | |
|---|---|---|---|
| 4,746,762 A | 5/1988 | Avidan et al. |
| 4,882,380 A | 11/1989 | Ficker et al. |
| 5,093,415 A | 3/1992 | Brady, III et al. |
| 5,192,732 A | 3/1993 | Duranel et al. |
| 5,432,244 A | 7/1995 | Rebhan |
| 5,453,466 A | 9/1995 | Pellegatti et al. |
| 5,461,115 A | 10/1995 | Oka |
| 5,462,999 A | 10/1995 | Griffin et al. |
| 5,529,850 A | 6/1996 | Morini et al. |
| 5,539,309 A | 7/1996 | Van Wyk et al. |
| 5,652,303 A | 7/1997 | Ishimaru et al. |
| 5,698,642 A | 12/1997 | Govoni et al. |
| 5,844,046 A * | 12/1998 | Ohgizawa et al. ........... 525/270 |
| 6,005,034 A | 12/1999 | Hayashida et al. |
| 6,087,459 A | 7/2000 | Miro et al. |
| 6,214,939 B1 | 4/2001 | Shinozaki et al. |
| 6,391,985 B1 | 5/2002 | Goode et al. |
| 6,460,412 B1 | 10/2002 | Cai et al. |
| 6,576,697 B1 | 6/2003 | Brown, Jr. |
| 6,753,390 B2 | 6/2004 | Ehrman et al. |
| 6,759,489 B1 | 7/2004 | Turkistani |
| 6,825,146 B2 | 11/2004 | Kilty et al. |
| 6,900,281 B2 | 5/2005 | Streeky et al. |
| 7,025,938 B2 | 4/2006 | Olson et al. |
| 7,141,635 B2 | 11/2006 | Chen et al. |
| 7,226,977 B2 | 6/2007 | Kim et al. |
| 7,238,758 B2 | 7/2007 | Yoshikiyo et al. |
| 7,420,021 B2 | 9/2008 | Chen |
| 7,491,670 B2 | 2/2009 | Chen et al. |
| 7,935,766 B2 | 5/2011 | Sheard et al. |
| 8,067,510 B2 | 11/2011 | Sheard et al. |
| 8,263,692 B2 | 9/2012 | Sheard et al. |
| 8,779,058 B2 | 7/2014 | Sheard et al. |
| 2003/0149196 A1 | 8/2003 | Streeky et al. |
| 2003/0176611 A1 | 9/2003 | Stevens et al. |
| 2004/0082750 A1 | 4/2004 | Tau et al. |
| 2004/0127656 A1 | 7/2004 | Bauch |
| 2005/0143510 A1 | 6/2005 | Nakayama et al. |
| 2005/0239636 A1 | 10/2005 | Gao et al. |
| 2006/0167194 A1 | 7/2006 | Chen et al. |
| 2007/0027275 A1 | 2/2007 | Chen et al. |
| 2007/0032375 A1 | 2/2007 | Campbell et al. |
| 2007/0224641 A1 | 9/2007 | Campbell |
| 2007/0270558 A1 | 11/2007 | Scherrer et al. |
| 2007/0287813 A1 | 12/2007 | Meverden et al. |
| 2009/0118118 A1 | 5/2009 | Chen et al. |
| 2009/0209706 A1 | 8/2009 | Sheard et al. |
| 2009/0259006 A1 | 10/2009 | Kobayashi et al. |
| 2010/0130018 A1 | 5/2010 | Tokashiki et al. |
| 2012/0130018 A1 | 5/2012 | Sheard et al. |

FOREIGN PATENT DOCUMENTS

| | | | |
|---|---|---|---|
| CN | 87102435 A | 11/1987 |
| CN | 1306544 A | 8/2001 |

(Continued)

OTHER PUBLICATIONS

Machine translation of JP 05-105722.

(Continued)

*Primary Examiner* — Yun Qian
(74) *Attorney, Agent, or Firm* — Lerner, David, Littenberg, Krumholz & Mentlik, LLP

(57) ABSTRACT

A catalyst composition for the polymerization of propylene is provided. The catalyst composition includes one or more Ziegler-Natta procatalyst compositions having one or more transition metal compounds and one or more esters of aromatic dicarboxylic acid internal electron donors, one or more aluminum containing cocatalysts and a selectivity control agent (SCA). The SCA is a mixture of an activity limiting agent and a silane composition. The catalyst composition has a molar ratio of aluminum to total SCA from 0.5:1 to 4:1. This aluminum/SCA ratio improves polymerization productivity and the polymer production rate. The catalyst composition is self-extinguishing.

9 Claims, 10 Drawing Sheets

(56) References Cited

FOREIGN PATENT DOCUMENTS

| | | |
|---|---|---|
| CN | 1112375 C | 6/2003 |
| CN | 1612901 A | 5/2005 |
| CN | 1856514 A | 11/2006 |
| CN | 1938340 A | 3/2007 |
| CN | 101835812 A | 9/2010 |
| EP | 0236082 A2 | 9/1987 |
| EP | 0385765 A2 | 9/1990 |
| EP | 0491584 A2 | 6/1992 |
| EP | 0676419 A1 | 10/1995 |
| EP | 0728769 A1 | 8/1996 |
| EP | 0736552 A2 | 10/1996 |
| EP | 1244717 B1 | 1/2004 |
| EP | 1935938 A1 | 6/2008 |
| EP | 1980576 A1 | 10/2008 |
| JP | 63-243107 | 10/1988 |
| JP | 3-168224 | 7/1991 |
| JP | 05-105722 | 4/1993 |
| JP | 06-145269 | 5/1994 |
| JP | 7-149812 | 6/1995 |
| JP | 11-255822 | 9/1999 |
| JP | 2002514666 A | 5/2002 |
| JP | 2005514499 A | 5/2005 |
| JP | 2005-232413 A | 9/2005 |
| JP | 2007-505984 A | 3/2007 |
| JP | 2007506837 A | 3/2007 |
| JP | 2007-254671 A | 10/2007 |
| JP | 2008503602 A | 2/2008 |
| JP | 2009508657 A | 3/2009 |
| KR | 0430512 | 7/2004 |
| WO | 0055215 A1 | 9/2000 |
| WO | 0109196 A1 | 2/2001 |
| WO | 0235206 A2 | 5/2002 |
| WO | 03059966 A1 | 7/2003 |
| WO | 2005/030815 A1 | 4/2005 |
| WO | 2005035594 A1 | 4/2005 |
| WO | 2006067052 A1 | 6/2006 |
| WO | 2007035885 A2 | 3/2007 |
| WO | 2007088887 A1 | 8/2007 |
| WO | 2009029487 A1 | 3/2009 |

OTHER PUBLICATIONS

Machine translation of JP 07-149812.

Burdett, I.D., et al., "Gas-Phase Fluidization Technology for Production of Polyolefins", Union Carbide Corporation, 2001.
Cai, P, at al. Effect of Operating Temperature and Pressure on the Transition from Bubbling to Turbulent Fluidization. vol. 5, No. 1 Journal of Chemecial Industry and Engineering (China) 1990.
Cai, P., et al., "A Generalized Method for Predicting Gas Flow Distribution between the Phase in FBC", Fluidized Bed Combustion, vol. 2, 1993.
Cui, N. et al. Journal of Applied Polymer Science vol. 99 pp. 1399-1404 published online on Nov. 28, 2005.
International Search Report and Written Opinion for International Patent Application No. PCT/US2009/034875 dated Dec. 14, 2009.
J. Yerushalmi et al., Flow Regimes in Vertical Gas-Solid Contact Systems. The American Institute of Chemical Engineers, No. 176, vol. 74, 1978, pp. 1-13.
Li Youchou et al. The Dynamics of Fast Fluidization. Journal of Chemical Technology and Biotechnology, 34B, 1984, pp. 537-544.
Mori, M et al. Propylene Integral block copolymers prodn, with good flexibility and impact resistance—comprises catalyst components of magnesium and titanium cpds, organic cpd, and oxygen contg organo:silicon cpd. Thomson Scientific, 1994.
PCT Notification of Transmittal of the International Search Report and the Written Opinion of the International Searching Authority, or the Declaration, dated Feb. 10, 2009 for International Patent Application No. PCT/US2008/073882, filed Aug. 21, 2008.
PCT Notification of Transmittal of the International Search Report and the Written Opinion of the International Searching Authority, or the Declaration, dated Jul. 8, 2009 for the International Patent Application No. PCT/US2009/034881, filed Feb. 23, 2009.
PCT/US2008/073877 International Search Report, dated Jul. 3, 2009.
SP. Babu et al., Fluidization Correlations for Coal Gasification Materials—Minimum Fluidization Velocity and Fluidized Bed Expansion Ratio;The American Institute of Chemical Engineers, No. 176, vol. 74, 1978, pp. 176-186.
U.S. Appl. No. 61/141,902, filed Dec. 31, 2008.
National Center for Biotechnology Information. PubChem Compound Database; CID=67159838, https://pubchem.ncbi.nlm.nih.gov/compound/67159838 (accessed Jul. 5, 2017), 9 pages.

* cited by examiner

SELF-LIMITING CATALYST SYSTEM WITH CONTROLLED ALUMINUM TO SCA RATIO AND METHOD

REFERENCE TO RELATED APPLICATION

This application claims the benefit of U.S. Provisional Application No. 60/957,888, filed on Aug. 24, 2007; which application is fully incorporated herein by reference.

BACKGROUND

The present disclosure relates to stereoselective Ziegler-Natta catalyst compositions and polymerization reactions utilizing the catalyst composition.

Ziegler-Natta propylene polymerization catalyst compositions are known in the art. Typically, these compositions include transition metal moieties, such as titanium, magnesium and halide moieties in combination with an internal electron donor (referred to as a procatalyst); a co-catalyst, usually an organoaluminum compound; and a selectivity control agent (SCA). It is further known to utilize an SCA that is a mixture of two or more components in order to modify catalyst activity and/or adjust polymer properties. Problematic is the selection of suitable SCA mixtures as an SCA component which is effective with respect to one process or product parameter is oftentimes detrimental to another process or product parameter.

For example, third generation Ziegler-Natta catalysts typically contain a benzoate as an internal donor and use a benzoic acid ester (such as ethyl p-ethoxybenzoate) as an SCA component. This provides a self-extinguishing property to the catalyst. Benzoic acid esters, however, impart an undesirable odor to the formed polymer. This odor is detrimental as it limits the use of the formed polymer. In addition, the catalyst activity and stereoselectivity for third generation Ziegler-Natta catalysts is low. Furthermore, when benzoic acid-based SCAs are used with fourth generation catalysts that contain a phthalate as internal donor, the stereoselectivity of the polymer generated is too low for practical applications.

It would be desirable to develop a Ziegler-Natta catalyst composition with improved catalyst activity and improved productivity without sacrificing operability. Also desired is a catalyst composition that does not convey undesirable properties upon the resultant polymer.

SUMMARY

The present disclosure is directed to a catalyst composition with high catalyst activity that is self-extinguishing. The present catalyst composition produces a polypropylene homopolymer with high isotacticity, or a polymer containing propylene and one or more additional comonomers.

In an embodiment, a catalyst composition is provided for the polymerization of propylene. The catalyst composition includes one or more Ziegler-Natta procatalysts, one or more cocatalysts, and a selectivity control agent (SCA). The Ziegler-Natta procatalyst contains one or more transition metal compounds and one or more esters of aromatic dicarboxylic acid internal electron donors. The cocatalyst is one or more aluminum containing compounds. The SCA is a mixture of an activity limiting agent (ALA) such as a $C_4$-$C_{30}$ aliphatic acid ester and a silane composition. The catalyst composition has a molar ratio of aluminum to total SCA from 0.5:1 to 4:1. In an embodiment, the molar ratio of aluminum to total SCA is from 1:1 to 3:1 or 2.5:1.

In an embodiment. The catalyst composition has a molar ratio of aluminum to total SCA from 0.5:1 to 50:1 when the ALA is a (poly)(alkylene glycol) ester of $C_4$-$C_{30}$ aliphatic acid. The molar ratio of aluminum to total SCA can be from 0.75:1 to 30:1 or 1:1 to 20:1. The catalyst composition is self-extinguishing.

In an embodiment, the polymer formed from the catalyst composition does not have an odor. Suitable compositions for use in the SCA that yield an odor-free polymer include $C_{30}$ aliphatic acid esters, $C_8$-$C_{30}$ aliphatic acid esters, $C_2$-$C_{20}$ aliphatic alkyl esters of $C_8$-$C_{30}$ aliphatic acids, (poly)(alkylene glycol) mono- or di-esters of $C_4$-$C_{30}$ aliphatic acids, and polyether compounds that contains 2 or more ether linkages.

In an embodiment, the $C_4$-$C_{30}$ aliphatic ester may be isopropyl myristate, di-n-butyl sebacate, a (poly)(alkylene glycol) mono- or di-myristate, and combinations thereof. In a further embodiment, the silane composition is dicyclopentyldimethoxysilane, methylcyclohexyldimethoxysilane, or n-propyltrimethoxysilane.

In an embodiment, the silane composition is a mixture of one or more alkoxysilanes. The silane composition may be a blend of dimethyldimethoxysilane with dicyclopentyldimethoxysilane, methylcyclohexyldimethoxysilane, and/or n-propyltrimethoxysilane. In another embodiment, the silane composition may be a blend of dicyclopentyldimethoxysilane with methylcyclohexyldiethoxysilane, n-propyltriethoxysilane, tetramethoxysilane, tetraethoxysilane, di-n-butyldimethoxysilane, and/or diisobutyldiethoxysilane.

In an embodiment, the SCA includes 60-97 mole percent of the $C_4$-$C_{30}$ aliphatic ester and 3-40 mole percent silane composition. In addition, the molar ratio of aluminum to alkyl ester of $C_4$-$C_{30}$ aliphatic acid may be from 5.3 to 0.5:1. The molar ratio of aluminum to silane composition may be from 120:1 to 1.25:1.

In an embodiment, the catalyst composition contains isopropyl myristate and dicyclopentyldimethoxysilane. In a further embodiment, the catalyst composition contains di-n-butyl sebacate and dicyclopentyldimethoxysilane.

The present disclosure also provides another catalyst composition. The catalyst composition may be used for the polymerization of propylene and includes one or more Ziegler-Natta procatalyst compositions containing one or more transition metal compounds and one or more esters of aromatic dicarboxylic acid internal electron donors. One or more aluminum containing cocatalysts and a selectivity control agent (SCA) are present in the catalyst composition. The SCA is a mixture of a non-ester composition and a silane composition. The molar ratio of aluminum to total SCA is from 0.5:1 to 4:1.

The non-ester composition may be a polyether compound which include dialkyl diether compound. For example, the non-ester composition may be 2,2-diisobutyl-1,3-dimethoxypropane or poly(alkene glycol) material.

In an embodiment, the SCA may also include an activity limiting agent.

The present disclosure provides another catalyst composition. The catalyst composition may be used for the polymerization of propylene and includes one or more Ziegler-Natta procatalyst compositions. The Ziegler-Natta procatalyst composition contains one or more transition metal compounds and one or more esters of aromatic dicarboxylic acid internal electron donors. One or more aluminum containing cocatalysts and a selectivity control agent (SCA) are included in the catalyst composition. The SCA includes a alkoxysilane composition that is a first alkoxysilane and a second alkoxysilane and an ALA.

In an embodiment, the first alkoxysilane is dimethyldimethoxysilane, diisopropyldimethoxysilane, dicyclopentyldimethoxysilane, or bis(perhydroisoquinolino)dimethoxysilane. The second alkoxysilane is methylcyclohexyldimethoxysilane, tetraethoxysilane, and/ or n-propyltriethoxysilane. Any one or more first alkoxysilanes may be mixed with any one or more second alkoxysilanes to form the SCA.

In an embodiment, the first alkoxysilane is dimethyldimethoxysilane. The second alkoxysilane compound is dicyclopentyldimethoxysilane, methylcyclohexyldimethoxysilane, and/or n-propyltrimethoxysilane.

In an embodiment, the SCA includes an activity limiting agent. The molar ratio of aluminum to total SCA is from 0.5:1 to 4:1.

The present disclosure provides a polymerization process. The polymerization process includes introducing propylene and a catalyst composition into a polymerization reactor. The catalyst composition is composed of a Ziegler-Natta procatalyst composition, which contains an aromatic dicarboxylic acid ester internal electron donor, an aluminum containing cocatalyst, and a selectivity control agent (SCA). The SCA is a mixture of an activity limiting agent (ALA) and a silane composition. The process further includes maintaining an aluminum to total SCA ratio from 0.5:1 to 4:1.

In an embodiment, the ALA is an alkyl ester of $C_4$-$C_{30}$ aliphatic acid, a diether, or poly(alkene glycol) ester of $C_4$-$C_{30}$ aliphatic acid the aluminum to total SCA ratio is 0.5:1 to 50:1.

In an embodiment, the polymerization process includes introducing into the reactor an SCA that is a mixture of a $C_4$-$C_{30}$ aliphatic acid ester and a silane composition.

In an embodiment, the polymerization process includes introducing into the reactor an SCA that is a mixture of a non-ester composition and a silane composition.

In an embodiment, the polymerization process includes introducing into the reactor an SCA that is a mixture of a first alkoxysilane, a second alkoxysilane, and an activity limiting agent.

In an embodiment, the polymerization process includes maintaining an aluminum to titanium ratio of about 45:1. The process may entail extinguishing, with the catalyst composition, the polymerization process when the polymerization reactor has a temperature greater than 100° C.

In an embodiment, the propylene containing polymer has a xylene solubles content from about 0.5% to about 6.0% by weight.

The present disclosure provides another polymerization process. In an embodiment, the polymerization process includes reacting a gas comprising propylene and a catalyst composition in a polymerization reactor. The catalyst composition is composed of a Ziegler-Natta procatalyst composition, an internal electron donor, an aluminum containing cocatalyst, and a selectivity control agent (SCA). The SCA is a mixture of an activity limiting agent and an alkoxysilane composition and may be any of the SCAs described herein. The process further includes forming a fluidized bed of polymer particles. The fluidized bed has a bulk density. The method includes reducing a partial pressure of the propylene to increase the bulk density of the fluidized bed without reactor fouling. In an embodiment, the process includes maintaining, adjusting, or otherwise controlling the aluminum to total SCA ratio from 0.5:1 to 4:1. The catalyst composition extinguishes the polymerization process when the fluidized bed temperature is greater than about 100° C.

In an embodiment, the process includes increasing a bulk density of the fluidized bed. An increase in the fluidized bulk density increases the residence time of the catalyst composition in the reactor. This also results in a reduction in the amount of propylene used as a starting material. In other words, less propylene is required to maintain the same production rate.

In an embodiment, the process includes introducing the gas into the reactor with a dew point temperature from 1° C. to 10° C. less than the fluidized bed temperature and reducing an amount of liquid propylene present in the reactor.

In an embodiment, the propylene containing polymer has a xylene solubles content of less than about 6% by weight or from 0.5% to 6% by weight. The propylene containing polymer may also contain less than 3ppm, or less than 1 ppm, residual titanium.

The present disclosure provides another polymerization process. The polymerization process includes introducing a propylene gas, an ethylene gas, and a catalyst composition in a polymerization reactor. The catalyst composition is composed of a Ziegler-Natta procatalyst composition, an aromatic dicarboxylic acid ester internal electron donor, an aluminum containing cocatalyst, and a selectivity control agent (SCA). The SCA is a mixture of an activity limiting agent and a silane composition. The process includes maintaining an aluminum to total SCA ratio from 0.5:1 to 4:1 and forming a propylene and ethylene copolymer. The propylene and ethylene random copolymer may have an ethylene content greater than about 4% by weight.

In an embodiment, the activity limiting agent is an alkyl ester of $C_4$-$C_{30}$ aliphatic acid, a diether, a poly(alkene glycol) ester of $C_4$-$C_{30}$ aliphatic acid, and the process includes maintaining the aluminum to total SCA ratio from 0.5:1 to 50:1

In an embodiment, the process includes forming spherical particles of the propylene and ethylene copolymer. The process may further include eliminating or avoiding the formation of propylene-ethylene random copolymer particles with a "popcorn" or irregular morphology.

An advantage of the present disclosure is the provision of an improved catalyst composition.

An advantage of the present disclosure is the provision of a self-extinguishing catalyst composition.

An advantage of the present disclosure is the provision of a polymerization process with reduced reactor fouling and reduced polymer agglomeration.

An advantage of the present disclosure is the production of an odor-free propylene containing polymer.

An advantage of the present disclosure is the provision of a catalyst composition that permits an increase in the bulk density of the fluidized bed without risk of reactor fouling.

An advantage of the present disclosure is a polymerization process with improved productivity, an improved production rate, and good operability through the control of the aluminum to total SCA ratio of the catalyst composition.

DETAILED DESCRIPTION

Figure 1:
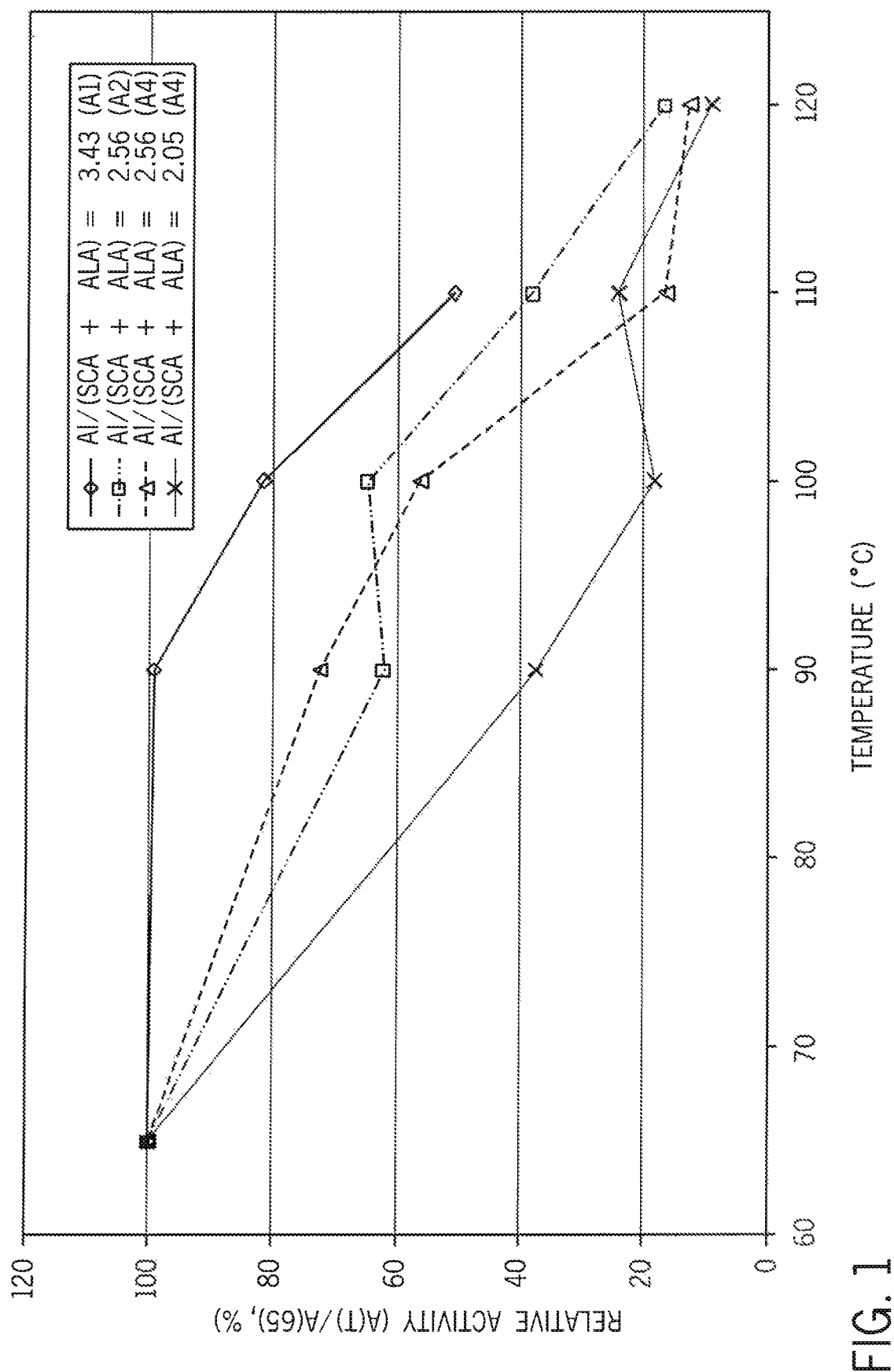
FIG. 1 is a relative activity v. temperature graph for a catalyst composition of the present disclosure.

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, weight percent of component, tan delta, molecular weights and other properties.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

As discussed above, the term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The terms "blend" or "polymer blend," as used herein, mean a composition of two or more polymers. Such a blend may or may not be miscible. Such a blend may or may not be phase separated. Such a blend may or may not contain one or more domain configurations, as determined from transmission electron spectroscopy.

The present catalyst composition contains a Ziegler-Natta procatalyst composition, a cocatalyst, and a selectivity control agent (SCA), each of which shall be discussed in detail below. Any conventional Ziegler-Natta procatalyst may be used in the present catalyst composition as is commonly known in the art. In embodiment, the Ziegler-Natta procatalyst composition contains a transition metal compound and a Group 2 metal compound. The transition metal compound may be a solid complex derived from a transition metal compound, for example, titanium-, zirconium-, chromium- or vanadium-hydrocarbyloxides, hydrocarbyls, halides, or mixtures thereof The transition metal compound has the general formula $TrX_x$ where Tr is the transition metal, X is a halogen or a $C_{1-10}$ hydrocarboxyl or hydrocarbyl group, and x is the number of such X groups in the compound in combination with a Group 2 metal compound. Tr may be a Group 4, 5 or 6 metal. In an embodiment, Tr is a Group 4 metal, such as titanium. X may be chloride, bromide, $C_{1-4}$ alkoxide or phenoxide, or a mixture thereof. In an embodiment, X is chloride.

Nonlimiting examples of suitable transition metal compounds that may be used to form the Ziegler-Natta procatalyst composition are $TiCl_4$, $ZrCl_4$, $TiBr_4$, $TiCl_3$, $Ti(OC_2H_5)_3Cl$, $Zr(OC_2H_5)_3Cl$, $Ti(OC_2H_5)_3Br$, $Ti(OC_3H_7)_2Cl_2$, $Ti(OC_6H_5)_2Cl_2$, $Zr(OC_2H_5)_2Cl_2$, and $Ti(OC_2H_5)Cl_3$. Mixtures of such transition metal compounds may be used as well. No restriction on the number of transition metal compounds is made as long as at least one transition metal compound is present. In an embodiment, the transition metal compound is a titanium compound.

Nonlimiting examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium. In an embodiment, the Group 2 metal compound is magnesium dichloride.

In a further embodiment, the Ziegler-Natta procatalyst composition is a mixture of titanium moieties supported on or otherwise derived from magnesium compounds. Suitable magnesium compounds include anhydrous magnesium chloride, magnesium chloride adducts, magnesium dialkoxides or aryloxides, or carboxylated magnesium dialkoxides or aryloxides. In an embodiment, the magnesium compound is a magnesium di($C_{1-4}$)alkoxide, such as diethoxymagnesium.

Nonlimiting examples of suitable titanium moieties include titanium alkoxides, titanium aryloxides, and/or titanium halides. Compounds used to prepare the Ziegler-Natta procatalyst composition include one or more magnesium-di ($C_{1-4}$)alkoxides, magnesium dihalides, magnesium alkoxyhalides, or mixtures thereof and one or more titanium tetra($C_{1-4}$) alkoxides, titanium tetrahalides, titanium($C_{1-4}$) alkoxyhalides, or mixtures thereof.

A precursor composition may be used to prepare the Ziegler-Natta procatalyst composition as is commonly known in art. The precursor composition may be prepared by the chlorination of the foregoing mixed magnesium compounds, titanium compounds, or mixtures thereof, and may involve the use of one or more compounds, referred to as "clipping agents", that aid in forming or solubilizing specific compositions via a solid/solid metathesis. Nonlimiting examples of suitable clipping agents include trialkylborates, especially triethylborate, phenolic compounds, especially cresol, and silanes.

In an embodiment, the precursor composition is a mixed magnesium/titanium compound of the formula $Mg_dTi(OR_e)_fX_g$ wherein $R_e$ is an aliphatic or aromatic hydrocarbon radical having 1 to 14 carbon atoms or COR' wherein R' is an aliphatic or aromatic hydrocarbon radical having 1 to 14 carbon atoms; each $OR_3$ group is the same or different; X is independently chlorine, bromine or iodine; d is 0.5 to 56, or 2-4; or 3; f is 2-116, or 5-15; and g is 0.5-116, or 1-3, or 2. The precursor may be prepared by controlled precipitation through removal of an alcohol from the reaction mixture used in its preparation. In an embodiment, the reaction medium comprises a mixture of an aromatic liquid, especially a chlorinated aromatic compound, such as chlorobenzene, with an alkanol, especially ethanol, and an inorganic chlorinating agent. Suitable inorganic chlorinating agents include chlorine derivatives of silicon, aluminum and titanium, such as titanium tetrachloride or titanium trichloride, and titanium tetrachloride in particular. The chlorinating agents lead to partial chlorination which results in a precursor containing relatively high level of alkoxy component(s). Removal of the alkanol from the solution used in the chlorination, results in precipitation of the solid precursor, having a desirable morphology and surface area. The precursor was separated from the reaction media. Moreover, the resulting precursor is particularly uniform particle sized and resistant to particle crumbling as well as degradation of the resulting procatalyst. In an embodiment, the precursor composition is $Mg_3Ti(OEt)_8Cl_2$.

The precursor is next converted to a solid procatalyst by further reaction (halogenation) with an inorganic halide compound, preferably a titanium halide compound, and incorporation of an internal electron donor. If not already incorporated into the precursor in sufficient quantity, the electron donor may be added separately before, during or after halogenation. This procedure may be repeated one or more times, optionally in the presence of additional additives or adjuvants, and the final solid product washed with an aliphatic solvent. Any method of making, recovering and storing the solid procatalyst is suitable for use in the present disclosure.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride. The optional hydrocarbon or halohydrocarbon solvent employed in the production of olefin polymerization procatalyst preferably contains up to 12 carbon atoms inclusive, or up to 9 carbon atoms inclusive. Exemplary hydrocarbons include pentane, octane, benzene, toluene, xylene, alkylbenzenes, and decahydronaphthalene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. The aliphatic halohydrocarbon may be a compound containing at least two chloride substituents such as carbon tetrachloride or 1,1,2-trichloroethane. The aromatic halohydrocarbon may be chlorobenzene or o-chlorotoluene.

The halogenation may be repeated one or more times, optionally accompanied by washing with an inert liquid such as an aliphatic or aromatic hydrocarbon or halohydrocarbon between halogenations and following halogenation. Further optionally one or more extractions involving contacting with an inert liquid diluent, especially an aliphatic or aromatic hydrocarbon, or aliphatic or aromatic halohydrocarbon, especially at an elevated temperature greater than 100° C., or greater than 110° C., may be employed to remove labile species, especially $TiCl_4$.

In an embodiment, the Ziegler-Natta procatalyst composition includes a solid catalyst component obtained by (i) suspending a dialkoxy magnesium in an aromatic hydrocarbon or halohydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

In an embodiment, the Ziegler-Natta procatalyst composition includes a solid catalyst component obtained by (i) suspending a precursor material of the formula $Mg_dTi(OR_e)_fX_g$ (as described previously) in an aromatic hydrocarbon or halohydrocarbon that is liquid at normal temperatures, (ii) contacting the precursor with a titanium halide and further (iii) contacting the resulting composition a second time with the titanium halide, and contacting the precursor with a diester of an aromatic dicarboxylic acid at some point during the treatment with the titanium halide in (ii).

The Ziegler-Natta procatalyst composition includes an internal electron donor. The internal electron donor provides tacticity control and catalyst crystallite sizing. Nonlimiting examples of suitable internal electron donors include aromatic dicarboxylic acid esters, halides or anhydrides or (poly)alkyl ether derivatives thereof, especially $C_{1-4}$ dialkyl esters of phthalic or terephthalic acid, phthaloyl dichloride, phthalic anhydride, and $C_{1-4}$ (poly)alkyl ether derivatives thereof. In an embodiment, the internal electron donor is diisobutyl phthalate or di-n-butyl phthalate.

The Ziegler-Natta procatalyst composition may also include an inert support material. The support may be an inert solid which does not adversely alter the catalytic performance of the transition metal compound. Examples include metal oxides, such as alumina, and metalloid oxides, such as silica.

The cocatalyst for use with the foregoing Ziegler-Natta procatalyst composition is an aluminum containing composition. Nonlimiting examples of suitable aluminum containing compositions include organoaluminum compounds, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10, or 1-6 carbon atoms in each alkyl- or alkoxide-group. In an embodiment, the cocatalyst is a $C_{1-4}$ trialkylaluminum compound, such as triethylaluminum (TEA). The molar ratio of aluminum to titanium of from 35:1 to 50:1. In an embodiment, the molar ratio of aluminum to titanium to 45:1.

The catalyst composition includes a selectivity control agent (SCA). The SCA is a mixture of (i) one or more activity limiting agents (ALA) and/or (ii) one or more silane compositions. In an embodiment, the ALA is an aliphatic ester. The aliphatic ester may be a $C_4$-$C_{30}$ aliphatic acid ester, may be a mono- or a poly-(two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ alkyl mono- or polycarboxylate derivatives of $C_{2-100}$ (poly)glycols or $C_{2-100}$ (poly)glycol ethers. In a further embodiment, the $C_4$-$C_{30}$ aliphatic acid ester may be isopropyl myristate, di-n-butyl sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment the ALA is a non-ester composition. As used herein, a "non-ester composition" is an atom, molecule, or compound that is free of an ester functional group. In other words, the "non-ester composition" does not contain the following functional group.

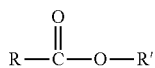

In an embodiment, the non-ester composition may be a dialkyl diether compound or an amine compound. The dialkyl diether compound is represented by the following formula,

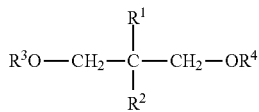

wherein $R^1$ $R^4$ are independently of one another an alkyl, aryl or aralkyl group having up to 20 carbon atoms, which may optionally contain a group 14, 15, 16, or 17 heteroatom, provided that R' and $R^2$ may be a hydrogen atom. Nonlimiting examples of suitable dialkyl ether compounds include dimethyl ether, diethyl ether, dibutyl ether, methyl ethyl ether, methyl butyl ether, methyl cyclohexyl ether, 2,2-dimethyl-1,3-dimethoxypropane, 2,2-diethyl-1,3-dimethoxypropane, 2,2-di-n-butyl-1,3-dimethoxypropane, 2,2-diisobutyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane, 2-isopropyl-2-isobutyl-1,3-dimethoxypropane, 2,2-dicyclopentyl-1,3-dimethoxypropane, 2-n-propyl-2-cyclohexyl-1, 3-diethoxypropane, and 9,9-bis(methoxymethyl)fluorene. In a further embodiment, the dialkyl ether compound is 2,2-diisobutyl-1,3-dimethoxypropane.

In an embodiment, the non-ester composition is an amine compound. Nonlimiting examples of suitable amine compounds include 2,6-substituted piperidines such as 2,6-dimethylpiperidine and 2,2,6,6-tetramethylpiperidine and 2,5-substituted piperidines. In a further embodiment, the piperidine compound is 2,2,6,6-tetramethylpiperidine.

For ALA that contains more than one carboxylate groups, all the carboxylate groups are considered effective components. For example, a sebacate molecule contains two carboxylate functional groups is considered to have two effective functional molecules.

The SCA includes a silane composition. The silane composition may include one or more alkoxysilanes having the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms R contains up to 20 atoms not counting hydrogen and halogen R' is a $C_{1-20}$ alkyl group, and m is 0, 1, 2 or 3. In an embodiment, R is $C_{6-12}$ aryl, alkyl or aralkyl, $C_{3-12}$ cycloallyl, $C_{3-12}$ branched alkyl, or $C_{3-12}$ cyclic amino group, R' is $C_{1-4}$ allyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, di-n-butyldimethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilanc, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the silane composition may be dicyclopentyldimethoxysilane, methylcyclohexyldimethoxysilane, or n-propyltrimethoxysilane, and any combination of thereof. In a further embodiment, the silane composition is dicyclopentyldimethoxysilane.

Broader molecular weight distribution (MWD) can be achieved using a blend of 2 silanes that exhibit different melt flow rates when used alone. By incorporating an ALA into the SCA compositions while controlling low Al/SCA ratio, a catalyst composition that leads to broad MWD while greatly reducing the tendency of reactor fouling can be obtained. Such composition include mixtures of at least 2 alkoxysilanes wherein one of the alkoxysilane yield polymer with a melt flow rate at least twice as high as the another polymer formed under the same polymerization condition and, an ALA selected from a carboxylic acid ester or a non-ester composition as described previously. The carboxylic acid ester ALA may be an ester of an aromatic carboxylic acid or a derivative thereof, an aliphatic ester, or a non-ester composition. Nonlimiting examples of suitable aromatic carboxylic acids include $C_{1-10}$ alkyl or cycloalkyl esters of aromatic monocarboxylic acids. Suitable substituted derivatives thereof include compounds substituted both on the aromatic ring(s) or the ester group with one or more substituents containing one or more Group 14, 15 or 16 heteroatoms, especially oxygen. Examples of such substituents include (poly)alkylether, cycloalkylether, arylether, aralkylether, alkylthioether, arylthioethcr, dialkylamine, diarylamine, diaralkylamine, and trialkylsilane groups. The aromatic carboxylic acid ester may be a $C_{1-20}$ hydrocarbyl ester of benzoic acid wherein the hydrocarbyl group is unsubstituted or substituted with one or more Group 14, 15 or 16 heteroatom containing substituents and $C_{1-20}$ (poly) hydrocarbyl ether derivatives thereof, or $C_{1-4}$ alkyl benzoates and $C_{1-4}$ ring alkylated derivatives thereof, or methyl benzoate, ethyl benzoate, propyl benzoate, methyl p-methoxybenzoate, methyl p-ethoxybenzoate, ethyl p-methoxybenzoate, and ethyl p-ethoxybenzoate.

In an embodiment, the aromatic monocarboxylic acid is ethyl p-ethoxybenzoate. In an alternative embodiment, the ALA is an aliphatic ester. The aliphatic ester may be a $C_4$-$C_{30}$ aliphatic acid ester, may be a mono- or a poly-(two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be isopropyl myristate, di-n-butyl sebacate, (poly) (alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, one of the alkoxysilanes in the mixtures is dicyclopentyldimethoxysilane or diisopropyldimethoxysilane while the other alkoxysilane is selected from ethyltriethoxysilane, n-propyltriethoxysilane, diisobutyldiethoxysilane, methylcyclohexyldiethoxysilane, di-n-butyldimethoxysilane, tetraethoxysilane, and tetramethoxysilane.

In an embodiment, the molar ratio of aluminum to total SCA is from 0.5:1 to 4:1 (or any value therebetween), or from 1:1 to 3:1, or from 2:1 to 3:1 or less than or equal to 2.5:1. As used herein, the "SCA" or the "total SCA" is combined amount of the ALA (if present) and the silane composition and the non-ester composition (if present) present in the catalyst composition. In an embodiment, the molar ratio of aluminum to total SCA is 2.5:1. In a further embodiment, the ALA is an alkyl ester of $C_4$-$C_{30}$ aliphatic acid or a non-ester composition.

In an embodiment, the molar ratio of aluminum to total SCA is from 0.5:1 to 50:1, or from 0.75:1 to 30:1, or 1:1 to 20:1 when (poly)(alkylene glycol) ester of $C_4$-$C_{30}$ aliphatic acid is the ALA.

The Applicants have surprisingly discovered that controlling the aluminum to SCA total molar ratio between 0.5:1 to 4:1 advantageously yields a catalyst system that exhibits high productivity with excellent operability and is self-extinguishing. Similarly, when the ALA is an alkyl ester of $C_4$-$C_{30}$ aliphatic acid, a non-ester composition, or a (poly)(alkylene glycol) ester of $C_4$-$C_{30}$ aliphatic acid and the aluminum to SCA total molar ratio is 0.5:1 to 50:1, the catalyst composition exhibits high productivity with excellent operability and is self-extinguishing. As used herein, a "self-extinguishing" catalyst is a catalyst that demonstrates decreased activity at a temperature greater than about 100° C. In other words, self-extinguishing is the decline of catalyst activity when the reaction temperature rises above 100° C. In addition, as a practical standard, if a polymerization process, especially a fluidized bed, gas-phase polymerization, running at normal processing conditions is capable of interruption and resulting collapse of the bed without adverse consequences with respect to agglomeration of polymer particles, the catalyst composition is said to be "self-extinguishing."

As a standardized measure of polymerization activity at elevated temperatures for use herein, catalyst activities are adjusted to compensate for different monomer concentrations due to temperature. For example, if liquid phase (slurry or solution) polymerization conditions are used, a correction factor to account for reduced propylene solubility in the reaction mixture at elevated temperatures is included. That is, the catalyst activity is "normalized" to compensate for the decreased solubility compared to the lower temperature, especially a 67° C. standard. The "normalized" activity, at temperature T, or $A_T$, is defined as the measured activity or (weight polymer/weight catalyst/hr) at temperature T, multiplied by a concentration correction factor, [P(67)]/[P(T)], where [P(67)] is the propylene concentration at 67° C. and [P(T)] is the propylene concentration at temperature T. The equation for normalized activity is provided below.

$$\text{Normalized Activity}(A) = \frac{[P(67)]}{[P(T)]} \times \text{Activity}(T)$$

In the equation, the activity at temperature T is multiplied by a ratio of the propylene concentration at 67° C. to the propylene concentration at temperature T. The resulting normalized activity (A), adjusted for the decrease in propylene concentration with temperature increase, may be used for comparison of catalyst activities under varying temperature conditions. The correction factors are listed below for the conditions used in the liquid phase polymerization.

| 67° C. | 85° C. | 100° C. | 115° C. | 130° C. | 145° C. |
|---|---|---|---|---|---|
| 1.00 | 1.42 | 1.93 | 2.39 | 2.98 | 3.70 |

The correction factor assumes that polymerization activity increases linearly with propylene concentration under the conditions employed. The correction factor is a function of the solvent or diluent used. For example, the correction factors listed above are for a common $C_{6-10}$ aliphatic hydrocarbon mixture (Isopar™E, available from Exxon Chemical Company). Under gas phase polymerization conditions, monomer solubility is normally not a factor and activity is generally uncorrected for temperature difference. That is, activity and normalized activity are the same.

The "normalized activity ratio" is defined as $A_T/A_{67}$, where $A_T$ is the activity at temperature T and $A_{67}$ is the activity at 67° C. This value can be used as an indicator of activity change as a function of temperature. For example, an $A_{100}/A_{67}$ equal to 0.30 shows that the catalyst activity at 100° C. is only 30 percent of the catalyst activity at 67° C. It has been found that at 100° C., an $A_{100}/A_{67}$ ratio of 35% or less yields a catalyst system that is self-extinguishing system.

Not wishing to be bound by any particular theory, it is believed that the Al/SCA ratio of 0.5:1 to 4.0:1 provides a sufficient amount of aluminum to support the polymerization reaction at normal polymerization temperatures. However, at elevated temperature (due to a temperature excursion or a process upset, for example), more aluminum species react with other catalyst components. This leads to an aluminum deficiency which slows the polymerization reaction. The aluminum deficiency causes a corresponding reduction in the number of electron donors complexed with the aluminum. The free electron pairs of the non-complexed donors poison the catalyst system, which self-extinguishes the reaction.

In an embodiment, the SCA is a mixture of an alkyl ester of $C_4$-$C_{30}$ aliphatic acid and an alkoxysilane composition. The catalyst composition has a molar ratio of aluminum to total SCA from 0.5:1 to 4:1. The SCA includes from about 60 mole percent to about 97 mole percent of the $C_4$-$C_{30}$ aliphatic ester and from about 3 mole percent to about 40 mole percent of the alkoxysilane composition.

The molar ratio of aluminum to alkoxysilane may be from 120:1 to 1.25:1 (or any value therebetween), or 40:1 to 1.67:1, or 20:1 to 2.5:1, or 13:1 to 5:1.

The molar ratio of aluminum to $C_4$-$C_{30}$ aliphatic acid ester may be 6.7:1 to 0.5:1 (or any value therebetween), or 5.7:1 to 0.52:1, or 5:1 to 0.62:1, or 4.4:1 to 0.71:1, or 5.3:1 to 0.5:1. The molar ratio of SCA to titanium may be from about 12.5:1 to about 70:1. In an embodiment, the SCA to titanium molar ratio is 30:1. The mole ratios between various components of the present catalyst system are set forth below in Table 1.

TABLE 1

| Mole Ratio | Range |
|---|---|
| Al to Ti | 35-50 |
| Al to SCA total | 0.5-4 |
| SCA total to Ti | 25-35 |
| Al to alkoxysilane | 1.25-80 |
| Al to $C_4$-$C_{30}$ aliphatic ester | 0.5-6.7 |

In an embodiment, the $C_4$-$C_{30}$ aliphatic acid ester is isopropyl myristate, di-n-butyl sebacate, (poly)(alkylene glycol) mono- or di-myristates, and combinations thereof. The alkoxysilane composition is dimethyldimethoxysilane, dicyclopentyldimethoxysilane, methylcyclohexyldimethoxysilane, n-propyltrimethoxysilane, or combinations thereof.

In a further embodiment, the SCA includes dicyclopentyldimethoxysilane with either isopropyl myristate or di-n-butyl sebacate.

In an embodiment, the SCA includes the $C_4$-$C_{30}$ aliphatic acid ester and an alkoxysilane composition that is a mixture of two or more alkoxysilanes. For example, the alkoxysilane composition may be a mixture of dimethyldimethoxysilane and dicyclopentyldimethoxysilane, methylcyclohexyldimethoxysilane, and/or n-propyltrimethoxysilane.

Nonlimiting examples of suitable SCAs with mole ratios for the $C_4$-$C_{30}$ aliphatic acid ester and the 'saute composition are provided in Table 2 below. Catalyst compositions including any of the SCAs set forth in Table 2 are self-extinguishing with a molar ratio of aluminum to total SCA from 0.5:1 to 4:1. When the ALA is an alkyl ester of $C_4$-$C_{30}$ aliphatic acid, a diether, or a poly(alkene glycol) ester of $C_4$-$C_{30}$ aliphatic acid, and aluminum to total SCA ration is 0.5:1 to 50:1, the catalyst is self-extinguishing.

TABLE 2

| Selectivity Control Agent | PEEB (mol %) | DBS (mol %) | IPM (mol %) | D (mol %) | C (mol %) | N (mol %) | DMDMS (mol %) | FIG. |
|---|---|---|---|---|---|---|---|---|
| A | 95 | | | 5 | | | | 1 |
| B | | 95 | | 5 | | | | 2 |
| C | | 80 | 20 | | | | | 3 |
| D | | 70 | 30 | | | | | 4 |
| E | | 60 | 40 | | | | | 5 |
| F | | 87.5 | 12.5 | | | | | 6 |
| H | | 95 | | | 5 | | | 7 |
| I | | 80 | | | 20 | | | 8 |
| J | | 90 | | | | 10 | | 9 |
| K | | 90 | | 3.5-3 | | | 6.5-7 | 10 |

PEEB: ethyl p-ethoxybenzoate
IPM: isopropyl myristate
D: dicyclopentyldimethoxysilane
C: methylcyclohexyldimethoxysilane
N: n-propyltrimethoxysilane
DMDMS: dimethyldimethoxysilane FIGS. 1-10 each show a relative activity v. temperature graph for a catalyst composition incorporating SHAC™ 320 and also incorporating a respective SCA of Table 2. The data presented in FIGS. 1-10 was gathered from experiments carried out in a gas phase reactor.

The experimental results indicate that as the Al/SCA ratio lowers, the ability of the catalyst composition to self extinguish increases. Moreover, as the Al/SCA ratio decreases, the xylene soluble content of the polypropylene also decreases.

TABLE 3

Activity Decay with Temperature Increase for MChDMS/DBS Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| A1 | MCHDMS | DBS | 3.43 | 0.52/19.86/1.00 | 2.56/97.44 | 65 | 17.92 | 100 | 6.7 |
| | | | | | | 90 | 17.76 | 99 | |
| | | | | | | 100 | 14.58 | 81 | |
| | | | | | | 110 | 9.11 | 51 | |
| A2 | MCHDMS | DBS | 2.56 | 0.50/19.00/1.00 | 2.56/97.44 | 65 | 12.23 | 100 | 4.5 |
| | | | | | | 90 | 7.60 | 62 | |
| | | | | | | 100 | 7.93 | 65 | |
| | | | | | | 110 | 4.63 | 38 | |
| | | | | | | 120 | 1.98 | 16 | |

TABLE 3-continued

Activity Decay with Temperature Increase for MChDMS/DBS Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| A3 | MCHDMS | DBS | 2.56 | 1.10/41.80/1.00 | 2.56/97.44 | 65 | 19.08 | 100 | 3.9 |
|  |  |  |  |  |  | 90 | 13.83 | 73 |  |
|  |  |  |  |  |  | 100 | 10.73 | 56 |  |
|  |  |  |  |  |  | 110 | 3.10 | 16 |  |
|  |  |  |  |  |  | 120 | 2.39 | 13 |  |
| A4 | MCHDMS | DBS | 2.05 | 1.38/52.26/1.00 | 2.56/97.44 | 65 | 12.45 | 100 | 2.9 |
|  |  |  |  |  |  | 90 | 4.67 | 38 |  |
|  |  |  |  |  |  | 100 | 2.26 | 18 |  |
|  |  |  |  |  |  | 110 | 2.97 | 24 |  |
|  |  |  |  |  |  | 120 | 1.13 | 9 |  |

*Each DBS has 2 carboxylate functional groups and therefore is counted as 2 ALA molecules.
MCHDMS: methylcyclohexyldimethoxysilane
DBS: di-n-butyl sebacate FIG. 1 shows a relative activity v. temperature graph for the examples set forth in Table 3.

TABLE 4

Activity Decay with Temperature Increase for MChDMS/IPM Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| B1 | MCHDMS | IPM | 3 | 0.83/15.83/1.00 | 5.00/95.00 | 65 | 28.90 | 100 | 3.71 |
|  |  |  |  |  |  | 90 | 18.76 | 65 |  |
|  |  |  |  |  |  | 100 | 16.26 | 56 |  |
|  |  |  |  |  |  | 110 | 17.09 | 59 |  |
|  |  |  |  |  |  | 120 | 7.92 | 27 |  |
| B2 | MCHDMS | IPM | 2.8 | 0.89/16.96/1.00 | 5.00/95.00 | 65 | 24.90 | 100 | 3.7 |
|  |  |  |  |  |  | 90 | 4.47 | 18 |  |
|  |  |  |  |  |  | 100 | 9.34 | 38 |  |
|  |  |  |  |  |  | 110 | 12.99 | 52 |  |
|  |  |  |  |  |  | 120 | 2.44 | 10 |  |
| B3 | MCHDMS | IPM | 2.5 | 1.00/19.00/1.00 | 5.00/95.00 | 65 | 21.34 | 100 | 3.2 |
|  |  |  |  |  |  | 90 | 2.26 | 11 |  |
|  |  |  |  |  |  | 100 | 1.29 | 6 |  |
|  |  |  |  |  |  | 110 | 3.23 | 15 |  |
|  |  |  |  |  |  | 120 | 0.65 | 3 |  |

MCHDMS: methylcyclohexyldimethoxysilane
IPM: isopropyl myristate

Figure 2:
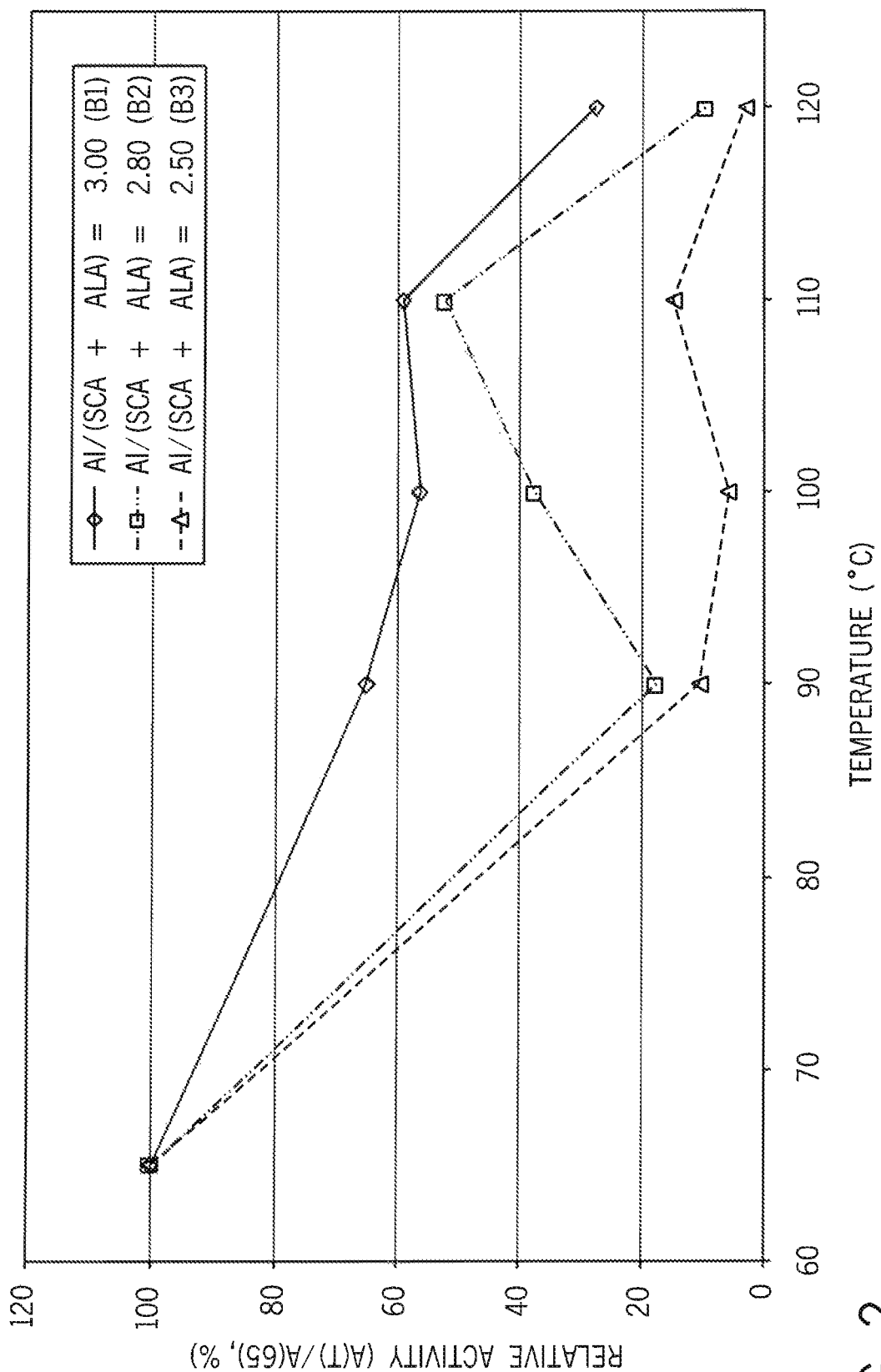
FIG. 2 is a relative activity v. temperature graph for a catalyst composition of the present disclosure.

FIG. 2 shows a relative activity v. temperature graph for the examples set forth in Table 4.

TABLE 5

Activity Decay with Temperature Increase for DCPDMS/IPM Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| C1 | DCPDMS | IPM | 2.3 | 4.35/17.39/1.00 | 20.00/80.00 | 65 | 22.43 | 100 | 2.15 |
|  |  |  |  |  |  | 90 | 17.77 | 79 |  |
|  |  |  |  |  |  | 100 | 16.19 | 72 |  |
|  |  |  |  |  |  | 110 | 12.38 | 55 |  |
|  |  |  |  |  |  | 120 | 6.03 | 27 |  |
| C2 | DCPDMS | IPM | 2.1 | 5.73/22.90/1.00 | 20.00/80.00 | 65 | 19.20 | 100 | 1.62 |
|  |  |  |  |  |  | 90 | 15.69 | 82 |  |
|  |  |  |  |  |  | 100 | 11.41 | 59 |  |
|  |  |  |  |  |  | 110 | 6.84 | 36 |  |
|  |  |  |  |  |  | 120 | 4.56 | 24 |  |

DCPDMS: dicyclopentyldimethoxysilane
IPM: isopropyl myristate

Figure 3:
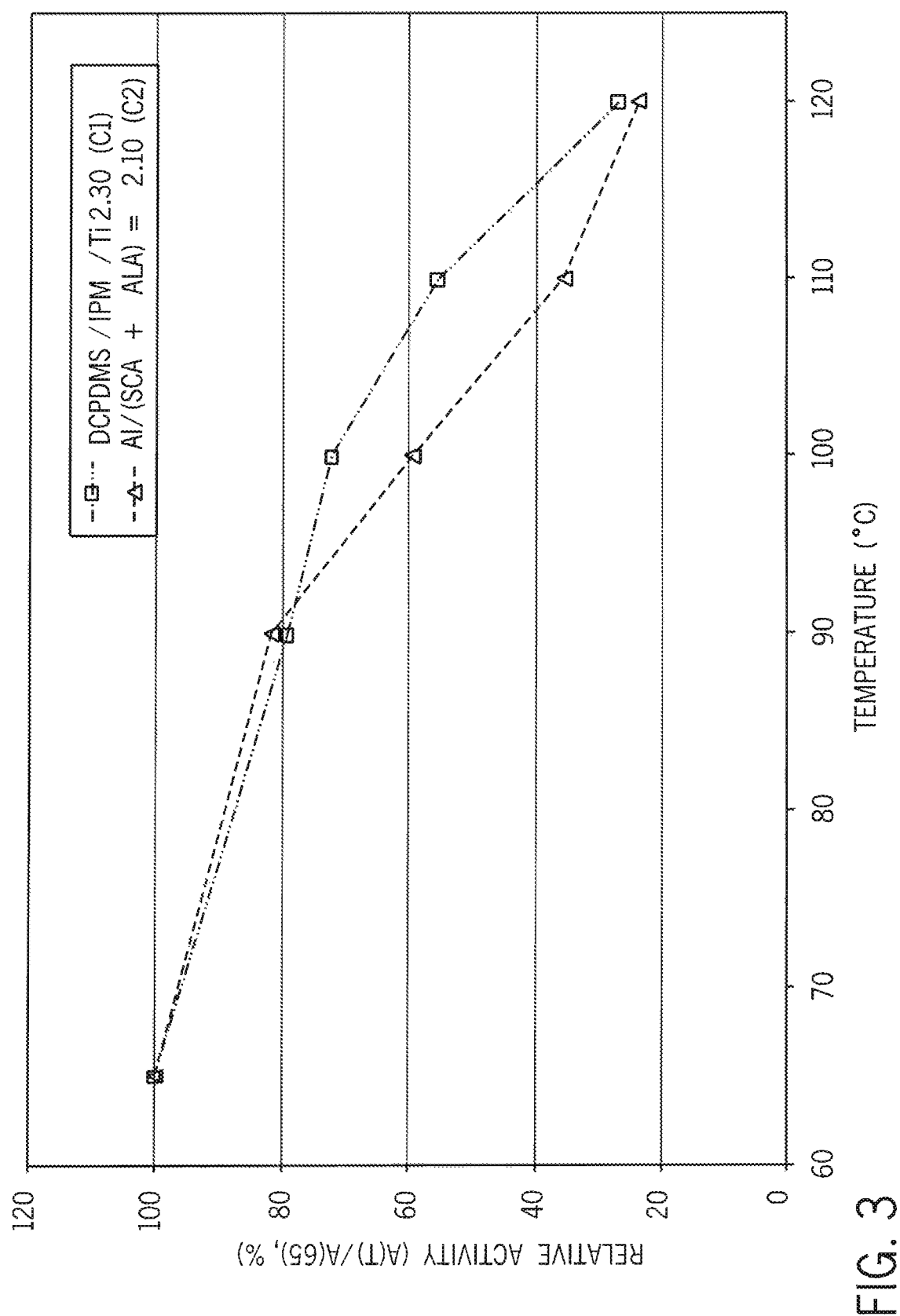
FIG. 3 is a relative activity v. temperature graph for a catalyst composition of the present disclosure.

FIG. 3 shows a relative activity v. temperature graph for the examples set forth in Table 5.

TABLE 6

Activity Decay with Temperature Increase for DCPDMS/IPM Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| D1 | DCPDMS | IPM | 2.3 | 8.36/19.51/1.00 | 30.00/70.00 | 65 | 24.48 | 100 | 1.94 |
|  |  |  |  |  |  | 90 | 19.97 | 82 |  |
|  |  |  |  |  |  | 100 | 13.85 | 57 |  |
|  |  |  |  |  |  | 110 | 7.73 | 32 |  |
|  |  |  |  |  |  | 120 | 3.54 | 14 |  |
| D2 | DCPDMS | IPM | 2.1 | 13.30/31.03/1.00 | 30.00/70.00 | 65 | 21.04 | 100 | 1.70 |
|  |  |  |  |  |  | 90 | 12.09 | 57 |  |
|  |  |  |  |  |  | 100 | 9.73 | 46 |  |
|  |  |  |  |  |  | 110 | 6.49 | 31 |  |
|  |  |  |  |  |  | 120 | 3.54 | 17 |  |
| D3 | DCPDMS | IPM | 2.0 | 9.43/22.00/1.00 | 30.00/70.00 | 65 | 17.92 | 100 | 1.61 |
|  |  |  |  |  |  | 90 | 11.64 | 65 |  |
|  |  |  |  |  |  | 100 | 8.59 | 48 |  |
|  |  |  |  |  |  | 110 | 4.16 | 23 |  |
|  |  |  |  |  |  | 120 | 2.49 | 14 |  |
| D4 | DCPDMS | IPM | 2.0 | 11.08/25.85/1.00 | 30.00/70.00 | 65 | 13.31 | 100 | 1.25 |
|  |  |  |  |  |  | 90 | 3.33 | 25 |  |
|  |  |  |  |  |  | 100 | 0.17 | 1 |  |
|  |  |  |  |  |  | 120 | 0.33 | 3 |  |
| G1 | DCPDMS |  | 2.0 | 25.00/0/1.00 | 100.00/0 | 65 | 18.79 | 100 | 1.53 |
|  |  |  |  |  |  | 90 | 18.87 | 100 |  |
|  |  |  |  |  |  | 100 | 9.80 | 52 |  |
|  |  |  |  |  |  | 110 | 3.58 | 19 |  |
|  |  |  |  |  |  | 120 | 2.63 | 14 |  |

DCPDMS: dicyclopentyldimethoxysilane
IPM: isopropyl myristate

Figure 4:
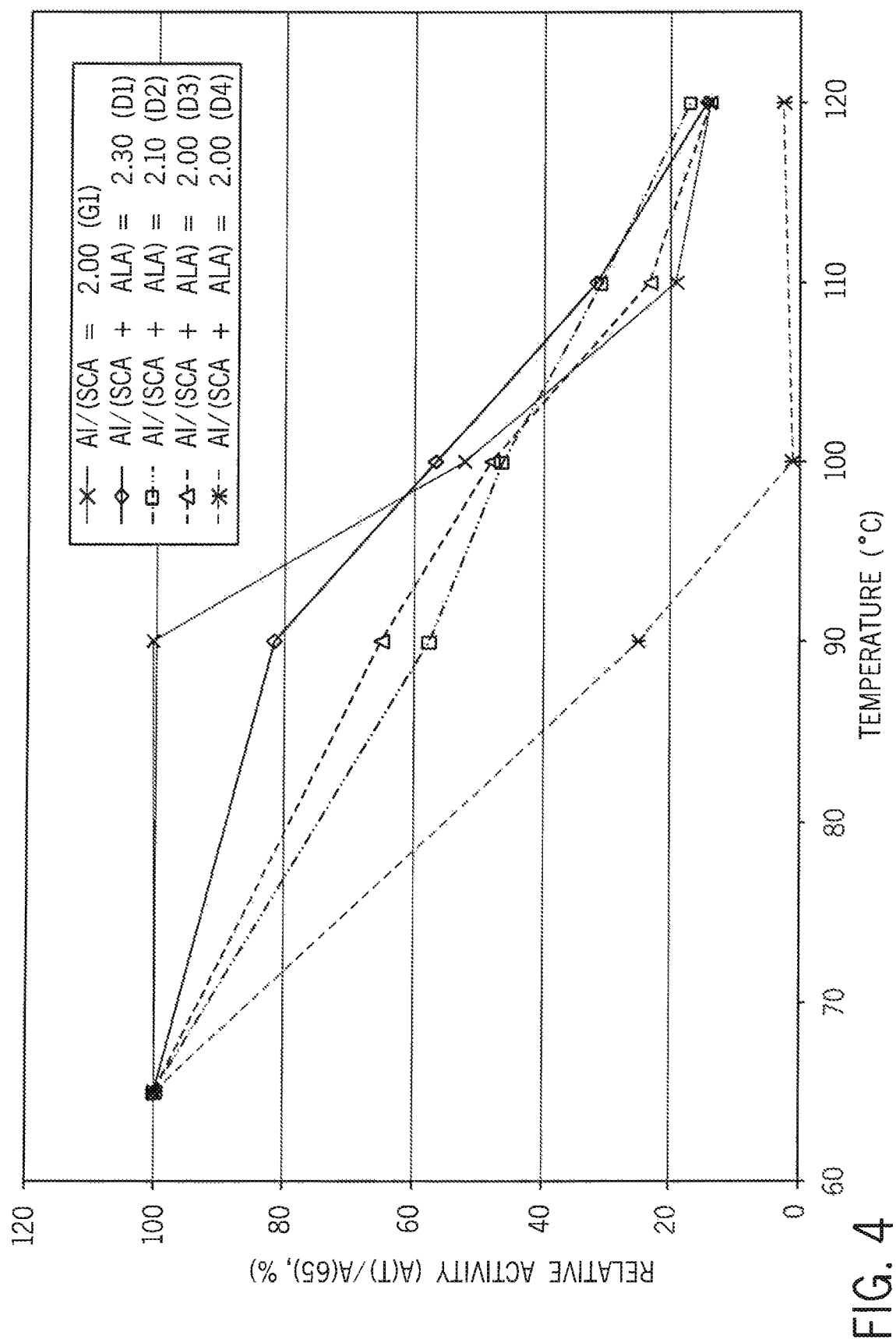
FIG. 4 is a relative activity v. temperature graph for a catalyst composition of the present disclosure.

FIG. 4 shows a relative activity v. temperature graph for the examples set forth in Table 6.

TABLE 7

Activity Decay with Temperature Increase for DCPDMS/IPM Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| E1 | DCPDMS | IPM | 2.8 | 6.43/9.64/1.00 | 40.00/60.00 | 65 | 34.03 | 100 | 2.32 |
|  |  |  |  |  |  | 90 | 46.99 | 138 |  |
|  |  |  |  |  |  | 100 | 27.84 | 82 |  |
|  |  |  |  |  |  | 110 | 13.34 | 39 |  |
|  |  |  |  |  |  | 120 | 4.64 | 14 |  |
| E2 | DCPDMS | IPM | 2.3 | 7.83/11.74/1.00 | 40.00/60.00 | 65 | 20.84 | 100 | 1.50 |
|  |  |  |  |  |  | 90 | 13.47 | 65 |  |
|  |  |  |  |  |  | 100 | 9.70 | 47 |  |
|  |  |  |  |  |  | 110 | 4.85 | 23 |  |
|  |  |  |  |  |  | 120 | 4.31 | 21 |  |
| E3 | DCPDMS | IPM | 1.4 | 12.86/19.29/1.00 | 40.00/60.00 | 65 | 12.23 | 100 | 1.12 |
|  |  |  |  |  |  | 90 | 4.74 | 39 |  |
|  |  |  |  |  |  | 100 | 5.98 | 49 |  |
|  |  |  |  |  |  | 110 | 3.71 | 30 |  |
|  |  |  |  |  |  | 120 | 2.68 | 22 |  |
| E4 | DCPDMS | IPM | 1.2 | 15.00/22.50/1.00 | 40.00/60.00 | 65 | 6.76 | 100 | 0.90 |
|  |  |  |  |  |  | 90 | 2.83 | 42 |  |
|  |  |  |  |  |  | 100 | 2.18 | 32 |  |
|  |  |  |  |  |  | 110 | 2.40 | 35 |  |
|  |  |  |  |  |  | 120 | 1.09 | 16 |  |

DCPDMS: dicyclopentyldimethoxysilane
IPM: isopropyl myristate

Figure 5:
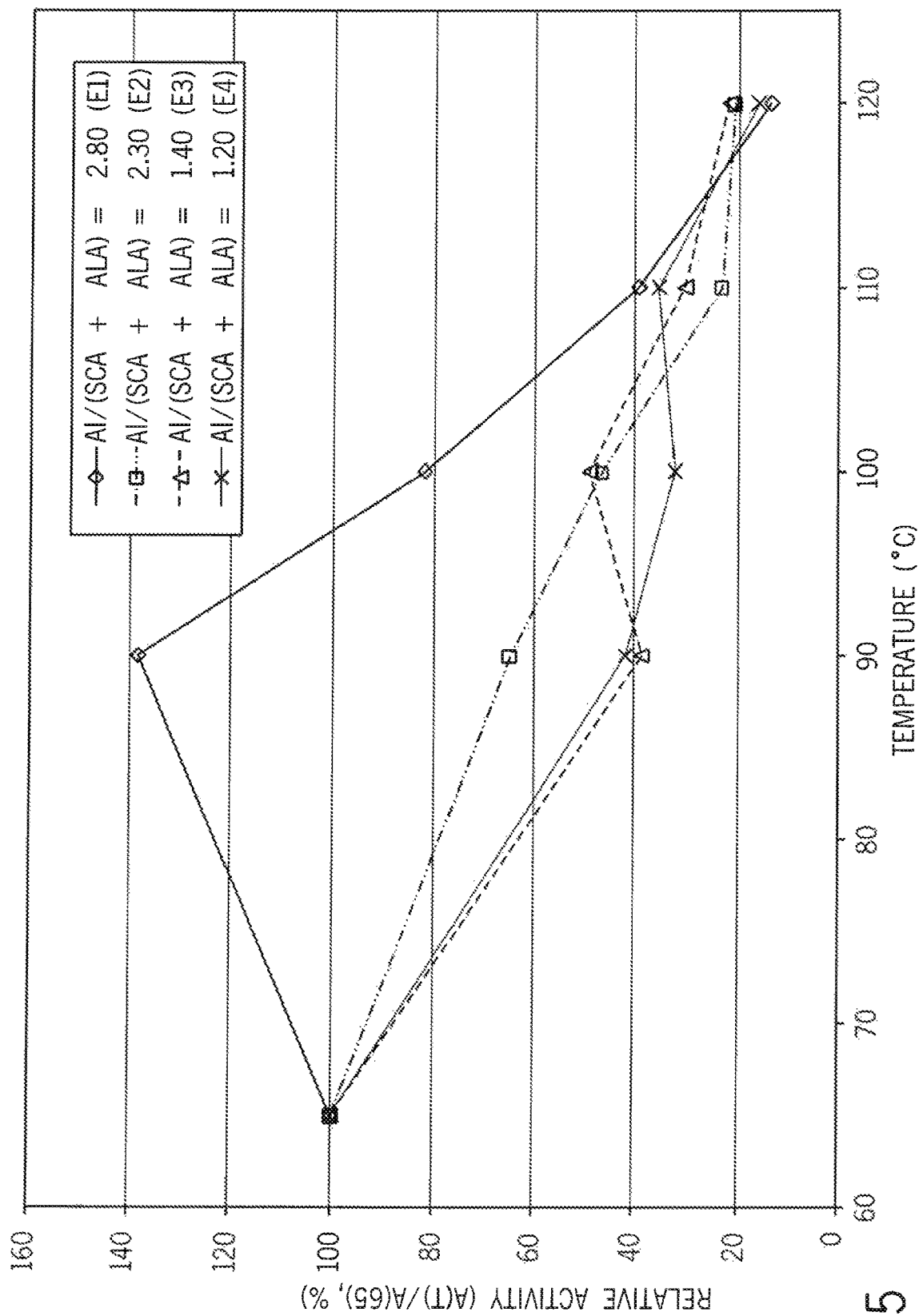
FIG. 5 is a relative activity v. temperature graph for a catalyst composition of the present disclosure.

FIG. 5 shows a relative activity v. temperature graph for the examples set forth in Table 7.

TABLE 8

Activity Decay with Temperature Increase for DCPDMS/IPM Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| F1 | DCPDMS | IPM | 2.5 | 2.50/17.50/1.00 | 12.50/87.50 | 65 | 16.62 | 100 | 2.21 |
|  |  |  |  |  |  | 90 | 10.29 | 62 |  |
|  |  |  |  |  |  | 100 | 7.55 | 45 |  |
|  |  |  |  |  |  | 110 | 5.26 | 32 |  |
|  |  |  |  |  |  | 120 | 2.29 | 14 |  |
| F2 | DCPDMS | IPM | 2.3 | 2.72/19.02/1.00 | 12.50/87.50 | 65 | 18.36 | 100 | 1.75 |
|  |  |  |  |  |  | 90 | 8.81 | 48 |  |
|  |  |  |  |  |  | 100 | 6.55 | 36 |  |
|  |  |  |  |  |  | 110 | 3.84 | 21 |  |
|  |  |  |  |  |  | 120 | 0.90 | 5 |  |
| F3 | DCPDMS | IPM | 2.1 | 2.98/20.83/1.00 | 12.50/87.50 | 65 | 13.53 | 100 | 1.74 |
|  |  |  |  |  |  | 90 | 3.20 | 24 |  |
|  |  |  |  |  |  | 100 | 2.35 | 17 |  |
|  |  |  |  |  |  | 110 | 0.85 | 6 |  |
|  |  |  |  |  |  | 120 | 0.21 | 2 |  |

DCPDMS: dicyclopentyldimethoxysilane
IPM: isopropyl myristate

Figure 6:
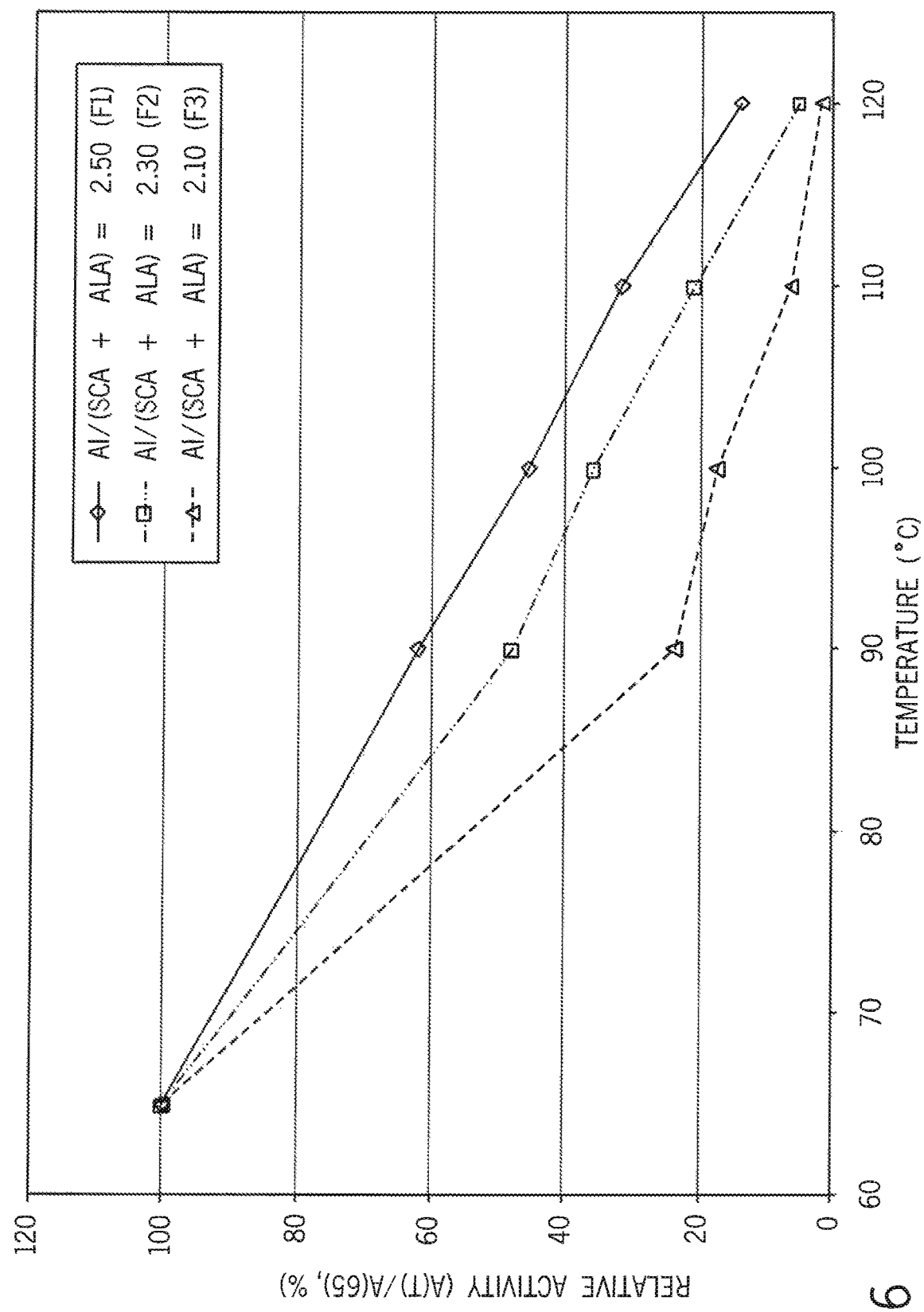
FIG. 6 is a relative activity v. temperature graph for a catalyst composition of the present disclosure.

FIG. 6 shows a relative activity v. temperature graph for the examples set forth in Table 8.

TABLE 9

Activity Decay with Temperature Increase for NPTMS/IPM Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| H1 | NPTMS | IPM | 3.3 | 0.76/14.39/1.00 | 5.00/95.00 | 65 | 32.05 | 100 | 6.10 |
|  |  |  |  |  |  | 90 | 23.08 | 72 |  |
|  |  |  |  |  |  | 100 | 19.23 | 60 |  |
|  |  |  |  |  |  | 110 | 14.90 | 47 |  |
|  |  |  |  |  |  | 120 | 2.40 | 8 |  |
| H2 | NPTMS | IPM | 3.0 | 0.83/18.83/1.00 | 5.00/95.00 | 65 | 24.63 | 100 | 4.90 |
|  |  |  |  |  |  | 90 | 11.08 | 45 |  |
|  |  |  |  |  |  | 100 | 12.31 | 50 |  |
|  |  |  |  |  |  | 110 | 8.31 | 34 |  |
|  |  |  |  |  |  | 120 | 1.54 | 6 |  |
| H3 | NPTMS | IPM | 2.8 | 0.89/16.96/1.00 | 5.00/95.00 | 65 | 23.04 | 100 | 4.20 |
|  |  |  |  |  |  | 90 | 9.26 | 40 |  |
|  |  |  |  |  |  | 100 | 6.77 | 29 |  |
|  |  |  |  |  |  | 110 | 5.34 | 23 |  |
|  |  |  |  |  |  | 120 | 2.85 | 12 |  |
| H4 | NPTMS | IPM | 2.5 | 1.00/19.00/1.00 | 5.00/95.00 | 65 | 18.17 | 100 | 4.36 |
|  |  |  |  |  |  | 90 | 0.90 | 5 |  |
|  |  |  |  |  |  | 110 | 0.68 | 4 |  |
|  |  |  |  |  |  | 120 | 0.45 | 2 |  |

NPTMS: n-propyltrimethoxysilane
IPM: isopropyl myristate

Figure 7:
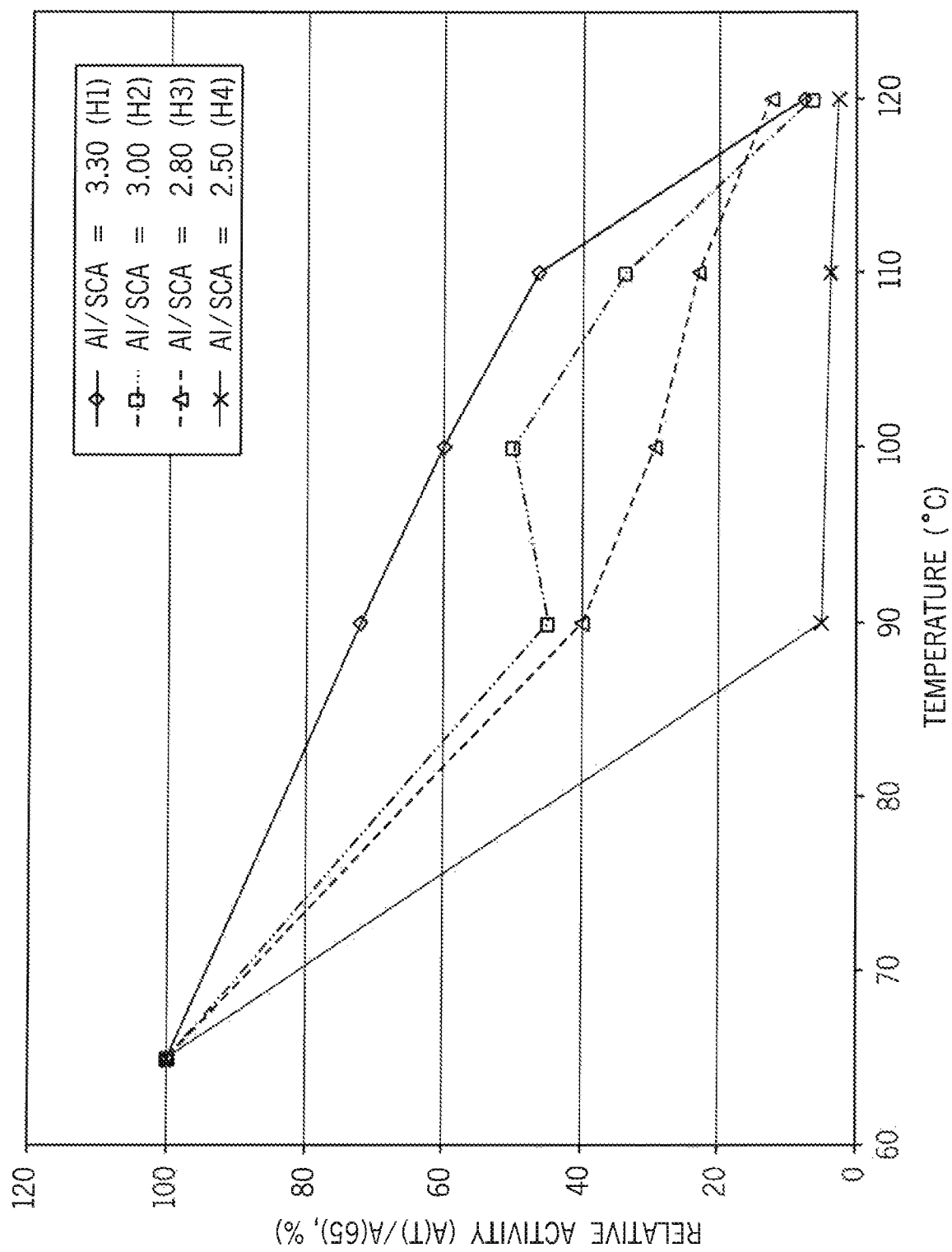
FIG. 7 is a relative activity v. temperature graph for a catalyst composition of the present disclosure.

FIG. 7 shows a relative activity v. temperature graph for the examples set forth in Table 9.

TABLE 10

Activity Decay with Temperature Increase for NPTMS/IPM Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| I1 | NPTMS | IPM | 3.7 | 2.70/10.81/1.00 | 20.00/80.00 | 65 | 21.87 | 100 | 3.54 |
|  |  |  |  |  |  | 90 | 18.80 | 86 |  |
|  |  |  |  |  |  | 100 | 16.06 | 73 |  |
|  |  |  |  |  |  | 110 | 14.01 | 64 |  |
|  |  |  |  |  |  | 120 | 7.86 | 36 |  |

TABLE 10-continued

Activity Decay with Temperature Increase for NPTMS/IPM Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| I2 | NPTMS | IPM | 3.0 | 3.33/13.33/1.00 | 20.00/80.00 | 65 | 24.48 | 100 | 3.34 |
|  |  |  |  |  |  | 90 | 17.55 | 72 |  |
|  |  |  |  |  |  | 100 | 15.51 | 63 |  |
|  |  |  |  |  |  | 110 | 11.43 | 47 |  |
|  |  |  |  |  |  | 120 | 8.16 | 33 |  |
| I3 | NPTMS | IPM | 2.5 | 4.00/16.00/1.00 | 20.00/80.00 | 65 | 21.35 | 100 | 3.08 |
|  |  |  |  |  |  | 90 | 11.01 | 52 |  |
|  |  |  |  |  |  | 100 | 11.01 | 52 |  |
|  |  |  |  |  |  | 110 | 9.34 | 44 |  |
|  |  |  |  |  |  | 120 | 5.67 | 27 |  |

NPTMS: n-propyltrimethoxysilane
IPM: isopropyl myristate

Figure 8:
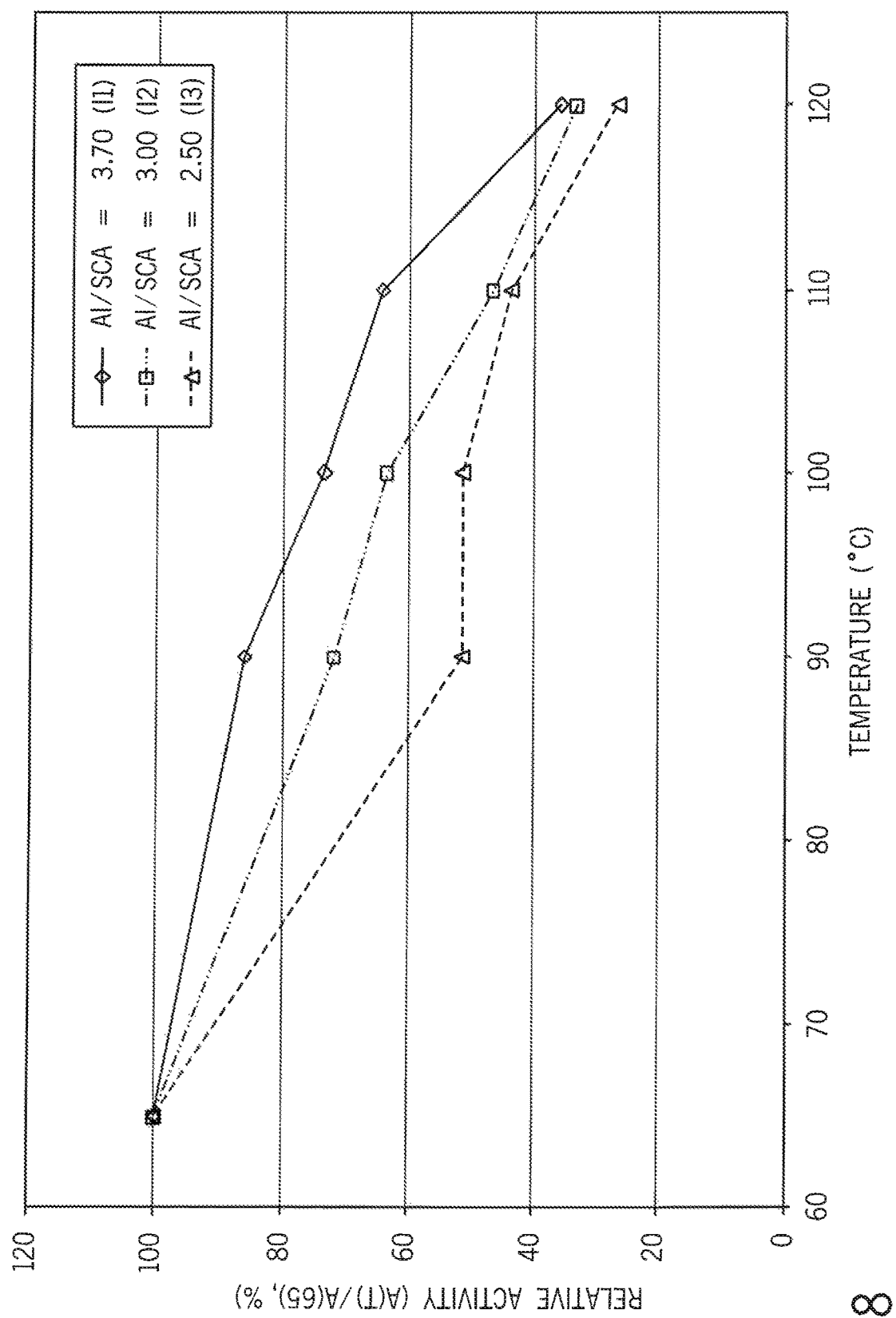
FIG. 8 is a relative activity v. temperature graph for a catalyst composition of the present disclosure.

FIG. 8 is a relative activity v. temperature graph for the examples set forth in Table 10.

TABLE 11

Activity Decay With Temperature Increase For NPTMS/IPM Systems

| Example | Silane | ALA | Al/(Silane + ALA) mol/mol | Silane/ALA/Ti (mol/mol/mol) | Silane/ALA (mol %) | Temp (° C.) | Catalyst Activity (kg/g) | A(T)/A(65) (%) | XS (wt %) |
|---|---|---|---|---|---|---|---|---|---|
| J1 | NPTMS | IPM | 3.4 | 1.47/13.24/1.00 | 10.00/90.00 | 65 | 20.36 | 100 | 4.53 |
|  |  |  |  |  |  | 90 | 13.15 | 65 |  |
|  |  |  |  |  |  | 100 | 8.93 | 44 |  |
|  |  |  |  |  |  | 110 | 1.88 | 9 |  |
|  |  |  |  |  |  | 120 | 0.71 | 3 |  |
| J2 | NPTMS | IPM | 2.7 | 1.85/16.67/1.00 | 10.00/90.00 | 65 | 19.37 | 100 | 3.62 |
|  |  |  |  |  |  | 90 | 3.73 | 19 |  |
|  |  |  |  |  |  | 100 | 1.60 | 8 |  |
|  |  |  |  |  |  | 110 | 0.53 | 3 |  |
|  |  |  |  |  |  | 120 | 0.00 | 0 |  |

NPTMS: n-propyltrimethoxysilane
IPM: isopropyl myristate

Figure 9:
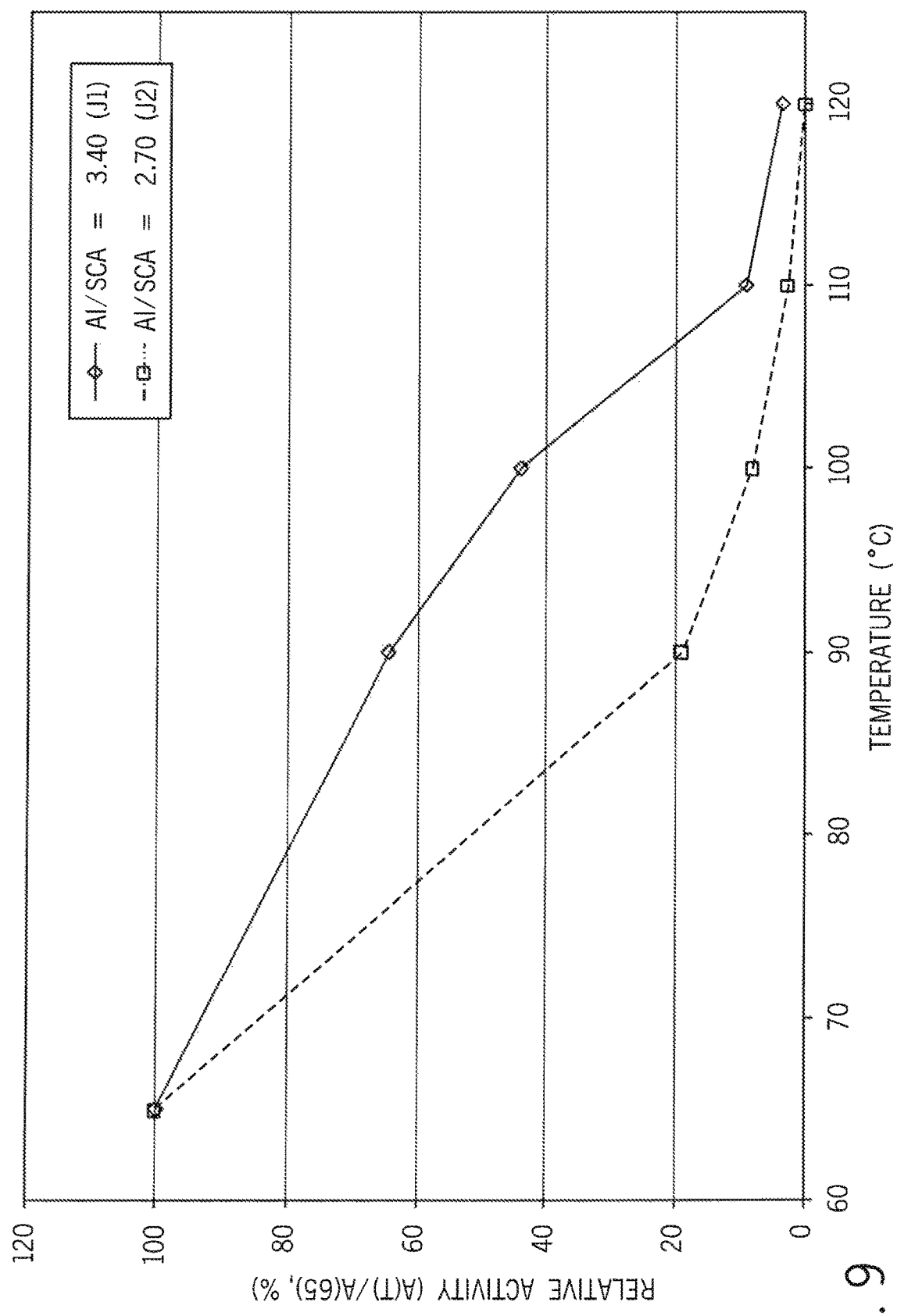
FIG. 9 is a relative activity v. temperature graph for a catalyst composition of the present disclosure.

FIG. 9 is a relative activity v. temperature graph for the examples set forth in Table 11.

TABLE 12

Activity Decay With Temperature Increase For MChDMS/DMDMS/IPM Systems

| Example | SCA1 | SCA2 | ALA | Al(SCA1 + SCA2 + ALA) | SCA1/SCA2/ALA/Ti (mol/mol/mol/mol) | (SCA1 + SCA2)/ALA (mol %) | Temp (° C.) | Catalyst Activity (kg/g) | A(T)/A(65) (%) | XS (wt %) |
|---|---|---|---|---|---|---|---|---|---|---|
| k1 | MChDMS | DMDMS |  | 2.80 | 0.54/1.25/16.07/1.00 | 10.00/90.00 | 65 | 22.16 | 100% | 6 |
|  |  |  |  |  |  |  | 90 | 7.82 | 35% |  |
|  |  |  |  |  |  |  | 100 | 7.49 | 34% |  |
|  |  |  |  |  |  |  | 110 | 3.26 | 15% |  |
|  |  |  |  |  |  |  | 120 | 4.89 | 22% |  |
| k2 | MChDMS | DMDMS | IPM | 2.76 | 0.54/1.27/16.30/1.00 | 10.00/90.00 | 65 | 21.10 | 100% | 5.5 |
|  |  |  |  |  |  |  | 90 | 4.02 | 19% |  |
|  |  |  |  |  |  |  | 100 | 0 | 0% |  |
|  |  |  |  |  |  |  | 110 | 0 | 0% |  |
|  |  |  |  |  |  |  | 120 | 0 | 0% |  |
| k3 | MChDMS | DMDMS | IPM | 2.70 | 0.56/1.30/16.67/1.00 | 10.00/90.00 | 65 | 15.36 | 100% | 5 |
|  |  |  |  |  |  |  | 90 | 1.48 | 10% |  |
|  |  |  |  |  |  |  | 100 | 0 | 0% |  |
|  |  |  |  |  |  |  | 110 | 0 | 0% |  |
|  |  |  |  |  |  |  | 120 | 0 | 0% |  |

Figure 10:
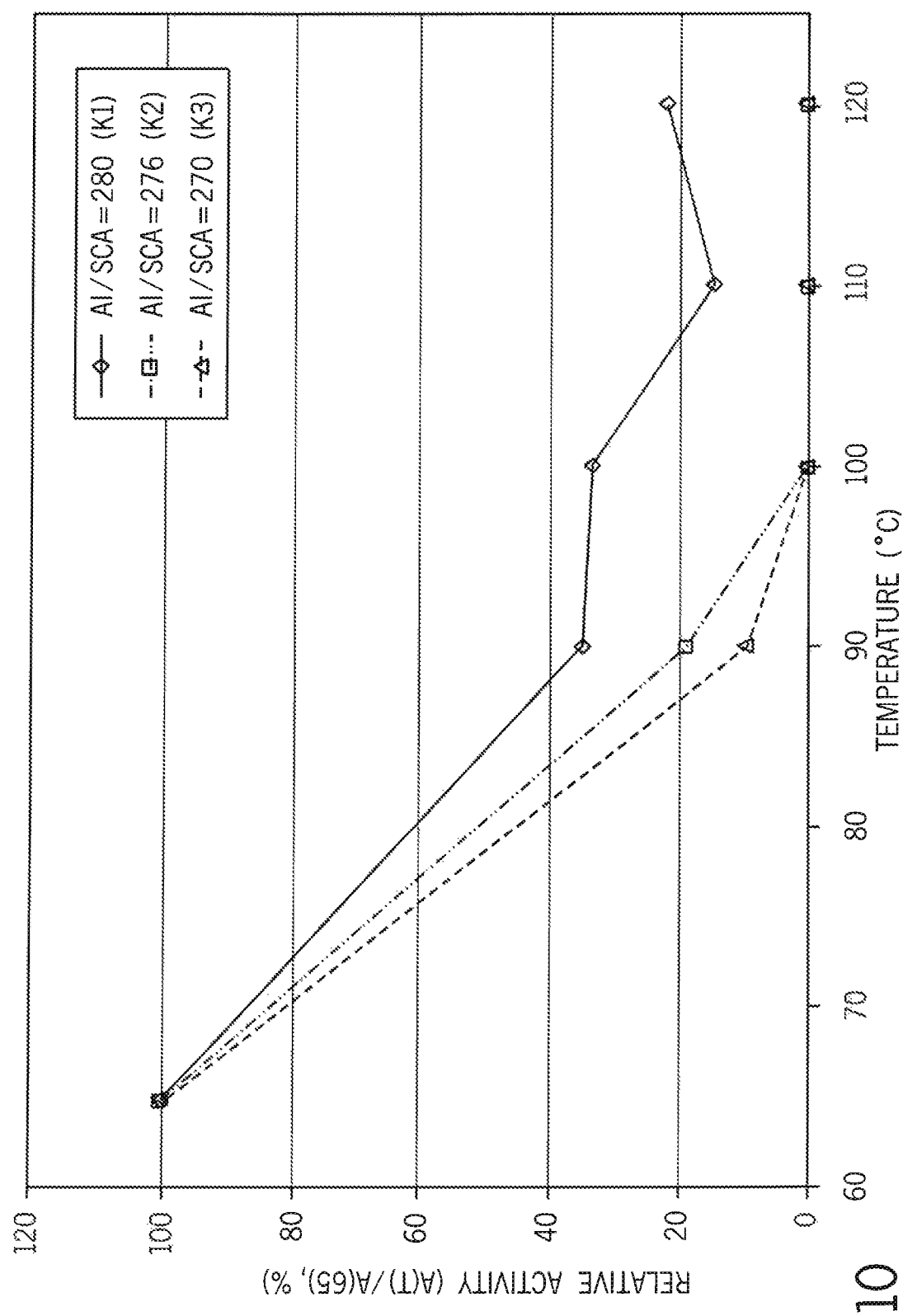
FIG. 10 is a relative activity v. temperature graph for a catalyst composition of the present disclosure.

MChDMS: methylcyclohexyldimethoxysilane
DMDMS: dimethyldimethoxysilane
IPM: isopropyl myristate FIG. 10 is a relative activity v. temperature graph for the examples set forth in Table 12.

In an embodiment, another catalyst composition is provided. The catalyst composition includes one or more Ziegler-Natta procatalyst compositions with one or more dicarboxylic acid ester internal electron donors and one or more aluminum containing cocatalysts as described above. The catalyst composition further includes a selectivity control agent (SCA) that is a mixture of the non-ester composition and the silane composition.

The non-ester composition may be a dialkyl diether compound as discussed above. The silane composition may be dimethyldimethoxysilane, dicyclopentyldimethoxysilane, methylcyclohexyldimethoxysilane, n-propyltrimethoxysilane, or any combination thereof. The Al to total SCA ratio is from 0.5:1 to 4.0:1 or any value therebetween as discussed above.

In an embodiment, the SCA includes the piperidine compound, the silane composition, and any ALA as discussed above. For example, the SCA includes 2,2,6,6-tetramethylpiperidine, methylcyclohexyldimethoxysilane, and an ALA of either di-n-butyl sebacate, or ethyl p-ethoxybenzoate, or isopropyl myristate.

In an embodiment, the SCA is a mixture of i) a blend of the non-ester composition and the silane composition and ii) an ALA. The molar ratio of the blend to the ALA is 5:95. The molar ratio of the non-ester composition to the silane composition is 1:1. The molar ratio of Al to total SCA is 3:1. In a further embodiment, the SCA is i) a blend of 2,2,6,6-tetramethylpiperidine and methylcyclohexyldimethoxysilane and ii) PEEB. In another embodiment, the SCA is i) a blend of diether compound and dicyclopentyldimethoxysilane and ii) isopropyl myristate.

In an embodiment, the SCA includes the dialkyl diether compound and the silane composition. The dialkyl diether compound may be 2,2-diisobutyl-1,3-dimethoxypropane. The silane composition may be dimethyldimethoxysilane, dicyclopentyldimethoxysilane, methylcyclohexyldimethoxysilane, n-propyltrimethoxysilane, or any combination thereof. The molar ratio of the dialkyl ether compound to the silane composition may be 95:5. The Al to total SCA ratio is from 0.5:1 to 4.0:1 or any value therebetween as discussed above. Nonlimiting examples of an SCA with a non-ester composition are set forth in Tables 13 and 14 below. Polymerization reactions were carried out in liquid phase PPR reactors.

TABLE 13

SCA with non-ester composition

| SCA1 | SCA2 | ALA | Al/(SCA1 + SCA2 + ALA) (mol/mol) | SCA1/SCA2/ ALA/Ti (mol/mol/mol) | (SCA1 + SCA2)/ ALA (mol) | Temp (° C.) | Activity (kg/g/hr) | | | Average Activity (kg/g/hr) | Normalized Activity (kg/g/hr) | A/$A_{67}$ (%) | Average XS (%) |
|---|---|---|---|---|---|---|---|---|---|---|---|---|---|
| TMPY | MChDMS | None | 3.0 | 15/15/0/1 | 100/0 | 67 | 4.92 | 6.34 | | 5.63 | 5.63 | 100 | 3.79 |
| | | | | | | 100 | 3.65 | 2.32 | 1.97 | 2.65 | 5.11 | 91 | 2.09 |
| | | | | | | 115 | 0.83 | 0.42 | 0.75 | 0.67 | 1.59 | 28 | 7.72 |
| TMPY | MChDMS | DBS | 16.7 | 0.75/0.75/28.5/1 | 5/95 | 67 | 5.90 | 4.49 | 4.17 | 4.85 | 4.85 | 100 | 7.34 |
| | | | | | | 100 | 0.64 | 0.86 | 0.74 | 0.75 | 1.44 | 30 | 10.30 |
| | | | | | | 115 | 0.12 | 0.35 | 0.34 | 0.27 | 0.65 | 13 | |
| TMPY | MChDMS | PEEB | 3.0 | 0.75/0.75/28.5/1 | 5/95 | 67 | 3.90 | 4.30 | 2.09 | 3.43 | 3.43 | 100 | 6.00 |
| | | | | | | 100 | 0.56 | 0.72 | 0.37 | 0.43 0.52 | 1.00 | 29 | |
| | | | | | | 115 | 0.06 | 0.05 | 0.05 | 0.10 0.07 | 0.16 | 5 | |
| TMPY | None | PEEB | 3.0 | 1.5/0/28.5/1 | 5/95 | 67 | 5.11 | 2.18 | 2.23 | 3.17 | 3.17 | 100 | 6.80 |
| | | | | | | 100 | 0.25 | 0.24 | 0.17 | 0.22 | 0.42 | 13 | |
| | | | | | | 115 | 0.09 | 0.06 | 0.04 | 0.06 | 0.15 | 5 | |
| None | MChDMS | PEEB | 3.0 | 0/1.5/28.5/1 | 5/95 | 67 | 4.85 | 3.98 | 3.74 | 4.19 | 4.19 | 100 | 3.96 |
| | | | | | | 100 | 0.42 | 0.44 | 0.27 | 0.38 | 0.73 | 17 | |
| | | | | | | 115 | 0.06 | 0.03 | 0.05 | 0.05 | 0.11 | 3 | |

SHAC ™ 320 catalyst was used
TMPY: 2,2,6,6-tetramethylpiperidine
MChDMS: methylcyclohexyldimethoxysilane
DBS: di-n-butyl sebacate
PEEB: ethyl p-ethoxybenzoate

TABLE 14

SCA with non-ester composition

| SCA | ALA | AL/(SCA + ALA) (mol/mol) | SCA/ALA/Ti (mol/mol/mol) | SCA/ALA (mol %) | Temp (° C.) | Activity (kg/g/hr) | | | Average Activity (kg/g/hr) | Normalized Activity (kg/g/hr) | A/A67 (%) |
|---|---|---|---|---|---|---|---|---|---|---|---|
| DCPDMS | None | 3.5 | 30/0/1 | 100/0 | 67 | 5.80 | 4.42 | 3.89 | 4.70 | 4.70 | 100 |
| | | | | | 100 | 2.47 | 3.13 | 2.50 | 2.70 | 5.21 | 111 |
| | | | | | 115 | 0.61 | 0.85 | 1.19 | 0.88 | 2.11 | 45 |
| DCPDMS | DIBDMP | 3.0 | 1.5/28.5/1 | 5/95 | 67 | 2.80 | 3.77 | 2.98 | 3.18 | 3.18 | 100 |
| | | | | | 100 | 0.32 | 0.32 | 0.39 | 0.34 | 0.66 | 21 |
| | | | | | 115 | 0.11 | 0.16 | 0.18 | 0.15 | 0.36 | 11 |
| DCPDMS | DIBDMP | 16.7 | 1.5/28.5/1 | 5/95 | 67 | 6.34 | 4.56 | 5.44 | 4.60 5.24 | 5.24 | 100 |
| | | | | | 100 | 0.86 | 1.18 | 1.28 | 1.22 1.14 | 2.19 | 42 |
| | | | | | 115 | 0.38 | 0.40 | 0.50 | 0.47 0.44 | 1.05 | 20 |

SHAC ™ 320 catalyst was used
DCPDMS: dicyclopentyldimethoxysilane
DiBDMP: 2,2-di-iso-butyl-1,3-dimethoxypropane In an embodiment, another catalyst composition is provided. The catalyst composition includes one or more Ziegler-Natta procatalyst compositions with one or more dicarboxylic acid ester internal electron donors and one or more aluminum containing cocatalysts as described above. The catalyst composition further includes a selectivity control agent (SCA) having a silane composition of a first alkoxysilane, a second alkoxysilane, and an ALA. The catalyst composition includes an Al to total SCA molar ratio of 0.5:1 to 4:1 (or any value therebetween). When the ALA is an alkyl ester of $C_4$-$C_{30}$ aliphatic acid, a diether, or a poly(alkene glycol) ester of $C_4$-$C_{30}$ aliphatic acid, the AL to total SCA ration is 0.5:1 to 50:1 for as ALA as discussed above.

The silane composition may be a mixture of any two or more alkoxysilanes disclosed herein. The molar ratio between the first alkoxysilane to the second alkoxysilane may be from 9:1 to 1:9 or any value therebetween. In an embodiment, the first alkoxysilane may be dimethyldimethoxysilane, diisopropyldimethoxysilane, dicyclopentyldimethoxysilane, or bis(perhydroisoquinolino)dimethoxysilane. The second alkoxysilane may be methylcyclohexyldimethoxysilane, tetraethoxysilane, or n-propyltriethoxysilane. It will be appreciated that myriad combinations of alkoxysilanes are within the scope of the present disclosure. Nonlimiting examples of suitable first alkoxysilane/second alkoxysilane combinations include diisopropyldimethoxysilane/methylcyclohexyldimethoxysilane, diisopropyldimethoxysilane/tetraethoxysilane, dicyclopentyldimethoxysilane/tetraethoxysilane, dicyclopentyldimethoxysilane/methylcyclohexyldimethoxysilane, and bis(perhydroisoquinolino)dimethoxysilane/n-propyltriethoxysilane.

In an embodiment, the first alkoxysilane is dimethyldimethoxysilane. The second alkoxysilane is dicyclopentyldimethoxysilane, methylcyclohexyldimethoxysilane, or n-propyltrimethoxysilane. In a further embodiment, the first alkoxysilane is dimethyldimethoxysilane and the second alkoxysilane is methylcyclohexyldimethoxysilane.

The SCA may also include an ALA. Nonlimiting examples of suitable ALAs include PEEB, a $C_4$-$C_{30}$ aliphatic acid ester, and a poly(ethylene)glycol coco fatty acid ester commercially available as S-191 from Chem Service, Inc., West Chester, Pa. The SCA may include 5-100 or 5-95 mole percent of the silane composition and 95-0 or 95-5 mole percent of the ALA.

Nonlimiting examples of suitable SCAs having first and second alkoxysilanes are set forth in Tables 15A and 15B below. SHAC™ 320 was used in each example presented in Tables 15A and 15B. Polymerization reactions were carried out in liquid phase PPR reactors.

TABLE 15A

SCA with first and second alkoxysilanes

| SCA1 | SCA2 | ALA | Al/(SCA1 + SCA2 + ALA) (mol/mol) | SCA1/SCA2/ ALA/Ti (mol/mol/mol) | (SCA1 + SCA2)/ALA (mol %) | Temp (° C.) | Activity (kg/g/hr) | | | Average Activity (kg/g/hr) | Normalized Activity (kg/g/hr) | Average XS (%) |
|---|---|---|---|---|---|---|---|---|---|---|---|---|
| DMDMS | MChDMS | PEEB | 3.0 | 0.75/0.75/28.5/1 | 5/95 | 67 | 3.72 | 3.62 | 4.50 | 3.95 | 3.95 | 5.91 |
| DMDMS | | PEEB | 3.0 | 1.5/0/28.5/1 | 5/95 | 67 | 5.86 | 3.16 | 3.68 | 4.23 | 4.23 | 7.65 |
| | MChDMS | PEEB | 3.0 | 0/1.5/28.5/1 | 5/95 | 67 | 4.61 | 4.18 | 4.71 | 4.50 | 4.50 | 4.19 |

DMDMS - Dimethyldimethoxysilane
MChDMS - Methylcyclohexyldimethoxysilane
PEEB - Ethyl p-Ethoxybenzoate

TABLE 15B

SCA with first and second alkoxysilanes

| SCA1 | SCA2 | ALA | Al/(SCA1 + SCA2 + ALA) (mol/mol) | SCA1/SCA2/ ALA/Ti (mol/mol/mol) | (SCA1 + SCA2)/ ALA (mol %) | Temp (° C.) | Activity (kg/g/hr) | | | Average Activity (kg/g/hr) | Normalized Activity (kg/g/hr) | A/A67 (%) |
|---|---|---|---|---|---|---|---|---|---|---|---|---|
| DMDMS | MChDMS | | 3.0 | 15/15/01 | 100/0 | 67 | 4.51 | 5.19 | | 4.85 | 4.85 | 100 |
| | | | | | | 100 | 1.34 | 0.93 | 0.96 | 1.08 | 2.08 | 43 |
| | | | | | | 115 | 0.31 | 0.21 | 0.28 | 0.27 | 0.64 | 13 |
| DMDMS | MChDMS | PEEB | 3.0 | 0.75/0.75/28.5/1 | 5/95 | 67 | 3.72 | 3.62 | 4.50 | 3.95 | 3.95 | 100 |
| | | | | | | 100 | 0.24 | 0.34 | 0.36 | 0.78 | 0.43 | 0.83 | 21 |
| | | | | | | 115 | 0.03 | 0.01 | 0.01 | 0.04 | 0.02 | 0.05 | 1 |
| DiPDMS | TEOS | | 3.0 | 3/27/0/1 | 100/0 | 67 | 4.22 | 4.01 | | 4.12 | 4.12 | 100 |
| | | | | | | 100 | 0.71 | 0.89 | 1.03 | 0.88 | 1.69 | 41 |
| | | | | | | 115 | 0.24 | 0.14 | 0.22 | 0.20 | 0.48 | 12 |
| DiPDMS | TEOS | PEEB | 3.0 | 0.3/2.7/27/1 | 10/90 | 67 | 2.99 | 3.11 | 3.88 | 3.33 | 3.33 | 100 |
| | | | | | | 100 | 0.22 | 0.26 | 0.31 | 0.41 | 0.30 | 0.58 | 17 |
| | | | | | | 115 | 0.05 | 0.04 | 0.05 | 0.03 | 0.04 | 0.10 | 3 |
| DiPDMS | TEOS | S-191 | 16.7 | 0.3/2.7/27/1 | 10/90 | 67 | 4.00 | 4.26 | 3.36 | 3.87 | 3.87 | 100 |
| | | | | | | 100 | 0.06 | 0.06 | 0.06 | 0.06 | 0.12 | 3 |
| | | | | | | 115 | 0.06 | 0.07 | 0.06 | 0.06 | 0.15 | 4 |
| DCPDMS | TEOS | | 3.0 | 9/21/0/1 | 100/0 | 67 | 3.98 | 4.71 | | 4.35 | 4.35 | 100 |
| | | | | | | 100 | 1.14 | 1.03 | 0.90 | 1.02 | 1.98 | 45 |
| | | | | | | 115 | 0.33 | 0.23 | 0.30 | 0.29 | 0.69 | 16 |
| DCPDMS | TEOS | PEEB | 3.0 | 0.3/2.7/27/1 | 10/90 | 67 | 3.85 | 3.85 | 4.18 | 3.96 | 3.96 | 100 |
| | | | | | | 100 | 0.47 | 0.47 | 0.44 | 0.41 | 0.45 | 0.86 | 22 |
| | | | | | | 115 | 0.08 | 0.08 | 0.07 | 0.08 | 0.08 | 0.19 | 5 |

TABLE 15B-continued

SCA with first and second alkoxysilanes

| SCA1 | SCA2 | ALA | Al/(SCA1 + SCA2 + ALA) (mol/mol) | SCA1/SCA2/ ALA/Ti (mol/mol/mol) | (SCA1 + SCA2)/ ALA (mol %) | Temp (° C.) | Activity (kg/g/hr) | | | Average Activity (kg/g/hr) | Normalized Activity (kg/g/hr) | A/A67 (%) |
|---|---|---|---|---|---|---|---|---|---|---|---|---|
| DCPDMS | TEOS | S-191 | 16.7 | 0.3/2.7/27/1 | 10/90 | 67 | 4.70 | 5.03 | 3.30 | 4.34 | 4.34 | 100 |
| | | | | | | 100 | 0.06 | 0.06 | 0.07 | 0.06 | 0.12 | 3 |
| | | | | | | 115 | 0.06 | 0.06 | 0.06 | 0.06 | 0.14 | 3 |
| DCPDMS | MChDMS | | 3.0 | 15/15/0/1 | 100/0 | 67 | 20.44 | 4.94 | 5.60 | 10.33 | 10.33 | 100 |
| | | | | | | 100 | 2.33 | 2.26 | 2.51 | 2.37 | 4.57 | 44 |
| | | | | | | 115 | 0.84 | 0.70 | 0.78 | 0.77 | 1.85 | 18 |
| DCPDMS | MChDMS | PEEB | 3.0 | 0.75/0.75/28.5/1 | 5/95 | 67 | 4.73 | 5.60 | 10.21 8.11 | 7.16 | 7.16 | 100 |
| | | | | | | 100 | 0.60 | 0.21 | 0.75 0.90 | 0.62 | 1.19 | 17 |
| | | | | | | 115 | 0.08 | 0.10 | 0.07 0.07 | 0.08 | 0.19 | 3 |
| DCPDMS | MChDMS | S-191 | 16.7 | 0.75/0.75/28.5/1 | 5/95 | 67 | 5.34 | 5.66 | 11.72 | 7.57 | 7.57 | 100 |
| | | | | | | 100 | 0.06 | 0.06 | 0.06 | 0.06 | 0.12 | 2 |
| | | | | | | 115 | 0.07 | 0.06 | 0.06 | 0.06 | 0.15 | 2 |
| BPIQ | PTES | | 3.0 | 15/15/0/1 | 100/0 | 67 | 3.33 | 4.17 | | 3.75 | 3.75 | 100 |
| | | | | | | 100 | 1.29 | 1.64 | 1.41 | 1.45 | 2.79 | 74 |
| | | | | | | 115 | 0.46 | 0.54 | 0.38 | 0.46 | 1.10 | 29 |
| BPIQ | PTES | PEEB | 3.0 | 0.75/0.75/28.5/1 | 5/95 | 67 | 4.70 | 2.80 | 4.78 | 4.09 | 4.09 | 100 |
| | | | | | | 100 | 0.43 | 0.62 | 0.23 | 0.43 | 0.82 | 20 |
| | | | | | | 115 | 0.06 | 0.05 | 0.05 0.04 | 0.05 | 0.12 | 3 |
| BPIQ | PTES | S-191 | 16.7 | 0.75/0.75/28.5/1 | 5/95 | 67 | 3.56 | 2.94 | 2.72 | 3.07 | 3.07 | 100 |
| | | | | | | 100 | 0.06 | 0.06 | 0.06 | 0.06 | 0.12 | 4 |
| | | | | | | 115 | 0.06 | 0.06 | 0.06 | 0.06 | 0.14 | 5 |

DMDMS - Dimethyldimethoxysilane
MChDMS - Methylcyclohexyldimethoxysilane
DiPDMS - Diisopropyldimethoxysilane
PEEB - Ethyl p-Ethoxybenzoate
S-191 - POE (15) coco fatty acids ester
BPIQ - Bis(perhydroisoquinolino)dimethoxysilane
PTES - n-Propyltriethoxysilane The present catalyst composition further yields a polypropylene composition with high stiffness, and high isotacticity (i.e., a low xylene solubles content). Not wishing to be bound by any particular theory, it is believed that the aluminum to SCA molar ratio results in a catalyst composition that replicates the self-extinguishing property of third generation catalysts which utilize benzoic acid esters as electron donors. Benzoic acid esters, such as ethyl p-ethoxybenzoate (PEEB), however, impart an undesirable odor to resultant polymers such as polypropylene. While using fourth generation catalysts containing a phthalate internal donor, the present catalyst compositions may or may not contain a benzoic acid ester. The embodiments of catalyst compositions without a benzoic acid ester correspondingly produce an odor-free polypropylene. In other words, the present catalyst compositions replicate PEEB-based catalyst systems yet produce an odor-free polypropylene composition. In addition, the present catalyst compositions meet or exceed the activity of conventional fourth generation catalysts, and in general, exceed the activity of the third generation catalysts.

In an embodiment, a polymerization process is provided. The polymerization process includes contacting propylene with a catalyst composition in a polymerization reactor. The catalyst composition includes one or more Ziegler-Natta procatalyst compositions having one or more transition metal compounds and one or more esters of aromatic dicarboxylic acid internal electron donors, one or more aluminum containing cocatalysts, and an SCA. The SCA is a mixture of an activity limiting agent and a silane composition as previously described herein. The method includes maintaining the molar ratio of aluminum to total SCA from about 0.5:1 to about 4:1 In other words, the aluminum to total SCA ratio is adjusted throughout the polymerization process to hold or control this ratio in the range of 0.5:1 to 4:1, or from 1:1 to 3:1, or 2.5:1. When the ALA is an alkyl ester of $C_4$-$C_{30}$ aliphatic acid, a diether, or a poly(alkene glycol) ester of $C_4$-$C_{30}$ aliphatic acid, the Al to total SCA ratio is 0.5:1 to 50:1, or from 0.75:1 to 30:1, or from 1:1 to 20:1. The polymerization process further includes forming a propylene containing polymer.

In an embodiment, the polymerization process may also include maintaining, adjusting, or otherwise controlling the aluminum to titanium ratio at about 45:1. Thus, the aluminum to SCA ratio is controlled by adjusting the amount SCA components introduced into the reaction while maintaining the aluminum at a constant amount.

In an embodiment, the polymerization process includes introducing into the reactor an SCA which is a mixture of a $C_4$-$C_{30}$ aliphatic acid ester and a silane composition. This produces a propylene containing polymer that is odor-free.

In an embodiment, the polymerization process includes introducing into the reactor an SCA which is a mixture of a non-ester composition and the silane composition.

In an embodiment, the polymerization process includes introducing into the reactor an SCA composed a first alkoxysilane, a second alkoxysilane, and an activity limiting agent as previously discussed herein.

The propylene containing polymer formed by way of the polymerization process may be a polypropylene homopolymer or a copolymer of propylene and one or more comonomers. The comonomer may be an alpha-olefin having from 2-12 carbon atoms. Nonlimiting examples of suitable comonomers include ethylene, 1-butene, 1-hexene, 4-methyl pentene, 1-heptene, and 1-octene. Consequently, the polypropylene composition may be a polypropylene homopolymer or a polymer with a propylene monomer and one or more comonomers. In an embodiment, the propylene containing polymer has a xylene solubles content from about 0.5% to about 6.0% by weight, or less than about 5% by weight.

In an embodiment, the polymerization process includes extinguishing, with the catalyst composition, the polymerization process or reaction when the temperature in the polymerization reactor is greater than about 100° C. The present catalyst composition enables steady-state polymerization without risk of reactor fouling, polymer agglomeration, or a run-away reaction.

The polymerization process may be a gas phase, a slurry, or a bulk polymerization process, operating in one or more than one reactor. A suitable gas phase polymerization process includes the use of condensing mode as well as super condensing mode wherein gaseous components including added inert low boiling compounds are injected into the reactor in liquid form for purposes of heat removal. When multiple reactors are employed, it is desirable that they operate in series, that is the effluent from the first reactor is charged to the second reactor and additional monomer or different monomer added to continue polymerization. Additional catalyst or catalyst components (that is procatalyst or cocatalyst) may be added, as well as additional quantities of the SCA mixture, another SCA mixture, or individual alkoxysilanes and/or one or more activity limiting agents.

In an embodiment, the polymerization process is conducted in two reactors in which two olefins, such as propylene and ethylene, are contacted to prepare a copolymer. Polypropylene is prepared in the first reactor and a copolymer of ethylene and propylene is prepared in the second reactor in the presence of the polypropylene from the first reactor. Regardless of the polymerization technique employed, it is understood that the SCA, the procatalyst, and/or the cocatalyst thereof may be contacted in the absence of other polymerization components, especially monomer, prior to addition to the reactor. In an embodiment, the foregoing dual polymerization processes are solution polymerizations.

The temperature of the polymerization reactor is from 40 to 130° C. or from 60 to 100° C., or from 65° C. to 80° C. The foregoing temperatures are average temperatures of the reaction mixture measured at the reactor walls. Isolated regions of the reactor may experience localized temperatures that exceed the foregoing limits.

In an embodiment, another polymerization process is provided. The polymerization process includes reacting a gas comprising propylene and a catalyst composition in a polymerization reactor. The catalyst composition is composed of a Ziegler-Natta procatalyst composition, an internal electron donor, an aluminum containing cocatalyst, and a selectivity control agent (SCA). The SCA is a mixture of an activity limiting agent and a silane composition and may be any of the SCAs described herein. The process further includes forming a fluidized bed of polymer particles. The fluidized bed has a bulk density. The method includes reducing a partial pressure of the propylene to increase the bulk density of the fluidized bed without reactor fouling. In an embodiment, the process includes maintaining, adjusting, or otherwise controlling the aluminum to total SCA ratio from 0.5:1 to 4:.1. When the ALA is an alkyl ester of $C_4$-$C_{30}$ aliphatic acid, a diether, or a poly(alkene glycol) ester of $C_4$-$C_{30}$ aliphatic acid, the Al to total SCA ratio of 0.5:1 to 50:1.

In an embodiment, the reaction occurs in a fluidized bed polymerization reactor. A fluidized bed polymerization reactor includes a wider upper section that serves to separate the fluidized polymer from gas continuously circulated through the reactor. The gas includes propylene (gas and/or liquid) alone or in combination with a carrier gas such as hydrogen, nitrogen and/or a noble gas. The gas may further include a second alpha-olefin gas, such as ethylene gas, for the polymerization of a propylene and alpha-olefin copolymer. The propylene gas may also include recirculated propylene gas and carrier gas alone or in combination with virgin propylene gas.

The catalyst composition is introduced into the gas stream. The catalyst composition may be any Ziegler-Natta catalyst composition disclosed herein. The catalyst composition is introduced into the gas stream. The propylene gas and the catalyst composition contact and exothermically react in the reactor. The fluidized bed is formed as a result of growing polymer particles, formed polymer particles, and a small amount of catalyst particles fluidized by the continuous flow of the polymerizable gas (i.e., the propylene gas) and optional modifying gasses present in the reactor. The bed is fluidized by continuously passing the gas therethrough. The fluidized bed has the general appearance of a dense mass of individually moving particles as created by the percolation of the gas through the bed. The fluidized bed is maintained at essentially a constant height by withdrawing a portion of the bed as product at the rate of formation of the particulate polymer product. The rate of heat generation is directly related to the rate of production. Thus, the primary limitation on production rate of the polymer is the rate at which heat can be removed from the polymerization zone.

As used herein, "reactor fouling" is the growth or adhesion of polymer upon the reactor walls. "Reactor fouling" also occurs when the free-flowing particles of the fluidized bed agglomerate and form chunks within the reactor. The Applicants have surprisingly discovered that provision of the present catalyst composition in the reactor advantageously permits an increase in the fluidized bulk density of the bed without reactor fouling. In other words, the bulk density of the bed may be increased without adversely impacting the fluidized particle distribution of the bed.

The bulk density of the fluidized bed is increased by reducing the partial pressure of the propylene in the gas and/or in the reactor. It has been found that controlling the aluminum to total SCA ratio from 0.5:1 to 4.0:1. When the ALA is a or alkyl ester of $C_4$-$C_{30}$ aliphatic acid, a diether, or a poly(alkene glycol) ester of $C_4$-$C_{30}$ aliphatic acid, the Al to total SCA ratio is 0.5:1 to 50:1. The present catalyst compositions advantageously permit the ability to increase the fluidized bed bulk density without risk of reactor fouling. Correspondingly, an increase in fluidized bed bulk density advantageously improves productivity. In an embodiment, the fluidized bed bulk density may be increased from about 10% to about 100% (or any value therebetween), or from about 20% to about 80%, or greater than 50% to 100%. For example, a reactor may have a fluidized bed bulk density of 10 tons/cm$^3$. Utilization of the present catalyst composition may increase this bulk density from 10 tons to about 11 tons/cm$^3$ (10% increase) to about 20 tons/cm$^3$ (100% increase), or any value therebetween.

The ability to reduce the partial pressure of the propylene without the risk of reactor fouling has a further advantage. In an embodiment, the partial pressure of the propylene is reduced to increase the residence time of the catalyst composition in the reactor. By giving the catalyst more time to react with the gas, the increase in residence time correspondingly increases the catalyst activity and reactor productivity. In an embodiment, the catalyst composition residence time may be increased from about 10% to about 100% (or any value therebetween). For example, a reactor may experience a catalyst residence time of one hour. Utilization of the present catalyst composition (which controls the aluminum to total SCA ratio between 0.5:1 to 4:1 or 0.5:1 to 50:1 when the ALA is a or alkyl ester of $C_4$-$C_{30}$ aliphatic acid, a diether, or a poly(alkene glycol) ester of $C_4$-$C_{30}$ aliphatic acid), may increase the catalyst residence time from about 1.1 hours (10% increase) to about 2.0 hours (100% increase).

The ability to reduce the partial pressure of the propylene without risk of reactor fouling has yet a further advantage. In an embodiment, the partial pressure of the propylene is reduced without decreasing or diminishing the production rate of the polymer. In other words, by increasing the fluidized bulk density of the bed, less propylene starting material is required to produce the same amount of polymer product. For example, a reactor utilizing a conventional Ziegler-Natta catalyst may have a production rate of about 15 ton/hour with a propylene partial pressure of about 28 kg/cm². A reactor utilizing the present catalyst composition may have a production rate of about 15 ton/hour and require a propylene partial pressure less than 28 kg/f/cm² or about 24-26 kg/f/cm².

In an embodiment, the gas has a dew point temperature. As used herein, the "dew point temperature" is that temperature at which liquid propylene condensate begins to form in the propylene gas. The "bed minus dew temperature" is the difference between the temperature of the fluidized bed and the dew point temperature of the propylene gas. Application of the present catalyst composition in the polymerization process yields a 1-10° C. or greater than a 1-2° C., or a 5-6° C. difference between the propylene gas dew point temperature and the bed temperature.

This difference of 1-10° C., also known as the bed minus dew value, carries several advantages. Reactors employing conventional Ziegler-Natta catalyst systems typically exhibit a bed minus dew value of about 1-2° C. This 1-2° C. bed minus dew value results in an amount of liquid propylene being present in the reactor. The liquid propylene serves to absorb heat of reaction (particularly during production spikes or production irregularities or production interrupt) and prevent reactor fouling.

Use of the present catalyst composition avoids the risk of reactor fouling as previously discussed. Consequently, the bed minus dew value may be increased without any adverse impact on the reaction and/or polymer. Increasing the bed minus dew value reduces, or wholly eliminates, the presence of liquid propylene in the reactor. This is advantageous as less liquid propylene present in the reactor corresponds to more propylene recycled back into the gas stream. More recycled propylene corresponds to more propylene available for polymerization. Thus, reducing the amount of liquid propylene in the reactor increases the amount of propylene available for production thereby improving production efficiency. Moreover, a reduction, or elimination, of liquid propylene in the reactor simplifies product retrieval. With the presence of less (or no) liquid propylene in the reactor, less (or no) liquid propylene is lost upon isolation of the propylene containing polymer. Indeed, with no liquid propylene in the reactor, a separation process is wholly eliminated.

The present catalyst composition yields myriad productivity and operability advantages. Provision of the present catalyst composition in the polymerization process: 1) permits a reduction in the partial pressure of the propylene gas reducing the amount of starting material; 2) increases the bulk density of the fluidized bed which; 3) reduces the gas velocity through the reactor and increases the residence time of the catalyst; and 4) increases the production rate; 5) increases productivity; while 6) maintain manageable operability. All these advantages occur without the risk of reactor fouling.

In addition, provision of the present catalyst composition permits continued operation through transient times, and results in consistent reactor sleeve temperatures during reactor operation as no static or skin disorders form on the reactor wall.

In an embodiment, the process forms a polypropylene homopolymer with xylene solubles content from about 0.5% to about 6% by weight. In addition, the increased residence time of the propylene gas contributes to the formation of a propylene containing composition with less than 3 ppm, or less than 1 ppm, residual titanium. In a further embodiment, the catalyst composition extinguishes the polymerization reaction when the fluidized bed temperature is greater than about 100° C.

In an embodiment, another polymerization process is provided. The process includes introducing a propylene gas, an ethylene gas and a catalyst composition in a polymerization reactor. The catalyst composition contains a Ziegler-Natta procatalyst composition, an aromatic dicarboxylic acid ester internal electron donor, an aluminum containing cocatalyst, and a selectivity control agent (SCA). The SCA includes a mixture of an activity limiting agent and a silane composition. The process further includes maintaining an aluminum to total SCA ratio from 0.5:1 to 4:1, (or from 0.5:1 to 50:1 when the ALA is an alkyl ester of $C_4$-$C_{30}$ aliphatic acid, a diether, or a poly(alkene glycol) ester of $C_4$-$C_{30}$ aliphatic acid), and forming a propylene and ethylene copolymer.

In an embodiment, the process includes forming a propylene and ethylene random copolymer having an ethylene content greater than about 4% by weight, or from about 4% to about 10% by weight ethylene. In yet a further embodiment, the process includes forming spherical particles of the propylene and ethylene copolymer.

Random propylene-ethylene copolymer particles with an ethylene content greater than 4% produced by conventional Ziegler-Natta catalyst systems tend to have an inconsistent, irregular or otherwise "popcorn-like" morphology. Remedies to this problem include a reduction in the partial pressure of the propylene during polymerization. Utilization of the present catalyst system does not require the propylene partial pressure to be reduced to eliminate the "popcorn" morphology of the propylene and ethylene copolymer particles. Use of the present catalyst composition yields spherical or nearly spherical random propylene and ethylene copolymer particles.

By way of example and not limitation, examples of the present disclosure will now be given.

EXAMPLES

A commercial SHAC™ 320 catalyst was used. Procatalyst A was made according to U.S. Pat. No. 5,093,415. Accordingly, Mg(OEt)$_2$ was slurried in a 50/50 (vol/vol) mixture of TiCl$_4$/MCB (monochlorobenzene) (20 liter/kilogram Mg(OEt)$_2$) with DIBP (diisobutyl phthalate) (0.3 liter/kilogram Mg(OEt)$_2$). After the mixture was heated at 106° C. for 60 minutes, it was filtered. The resulting moist mass was slurried in a 50/50 (by volume) TiCl$_4$/MCB mixture (20 liter/kilogram Mg(OEt)$_2$) at 106° C. for 30 minutes, filtered, and the process repeated one more time. The resulting solid was rinsed with isopentane and then dried with flowing warm nitrogen. The resulting procatalyst contained 2.5 percent Ti by weight.

Liquid Phase Polymerization in Parallel Polymerization Reactors (PPRs, by Symyx)

Catalyst particle size of the catalyst powder was reduced by stirring the powder with a stir bar for 30-45 minutes.

All SCAs and ALAs were diluted to 0.005 M in Isopar E™, except S-191 which was dissolved in toluene before injection into the PPRs. TEAl was prepared in Isopar E™ and used as either 0.02 or 0.1M solutions.

Purged PPR reactors were heated to 50° C., TEAl and Isopar E™ make-up solvent were added to each reactor, followed by the addition of $H_2$ to a stabilized pressure of 5 psig. Reactors were heated to the assigned temperature (67, 100 or 115° C.). Propylene was added to 100 psig and allowed to stabilize for 10 min. To each reactor was added SCA or mixture of SCA & SLA and a 500 ul of Isopar E™ chaser and immediately followed by the addition of catalyst (275 ul) and a 500 ul Isopar E™ chaser. Reactions were quenched with $CO_2$ after 60 minutes or when the maximum relative conversion of 110 was reached.

Gas Phase Polymerization:

The reactor is a pilot scale model, 35 cm in diameter and 8.4 m in height. The reactor contains a fluidized bed of polypropylene powder, which is fluidized by means of a compressor and recycle gas stream. Reactor temperature control is achieved by cooling the recycle gas stream by means of an in-line heat exchanger.

Catalyst, TEAL and a selectivity control agent (SCA) or donor are continuously fed to the reactor. Feeds are controlled in such a way as to maintain specific molar ratios of aluminum to SCA and TEAL to titanium.

Propylene, ethylene (in the case of ethylene random copolymer production) hydrogen, and nitrogen are continuously added to maintain the targeted total pressure and molar ratios of hydrogen to propylene and ethylene to propylene (in the case of ethylene random copolymer production). The total pressure and partial pressure of propylene are listed in the Table as well as the hydrogen/propylene molar ratio.

The resin product is transferred from the fluidized bed to a receiving drum continuously purged with humidified nitrogen.

The average residence time, based on production rate and reactor bed weight is approximately 2 hours. Catalyst productivity is determined from titanium analysis of the polypropylene product. In order to compare productivities obtained at different residence times, the results are normalized to an average residence time of 2 hours using an experimentally determined catalyst decay constant Standard conditions are typically:

| resin bed height | 32 kg |
| --- | --- |
| propylene partial pressure | 2.206 kPa |
| recycle gas velocity | 0.36 m/s |
| reactor temperature | 65° C. |
| reactor pressure | 2.896 kPa. |

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

For purposes of United States patent practice, the contents of any patent, patent application or publication referenced herein are hereby incorporated by reference in their entirety herein, especially with respect to the disclosure of structures, synthetic techniques and general knowledge in the art. It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

What is claimed is:

1. A catalyst composition for use in a propylene polymerization process comprising:
   one or more Ziegler-Natta procatalyst compositions comprising a transition metal compound containing magnesium and titanium, and one or more esters of aromatic dicarboxylic acid internal electron donors;
   one or more aluminum containing cocatalysts; and
   a selectivity control agent (SCA) comprising a mixture of:
   (A) a mixed silane composition comprising a mixture of:
   (i) a first alkoxysilane that is a dimethoxysilane selected from the group consisting of dimethyldimethoxysilane, diisopropyldimethoxysilane, dicyclopentyldimethoxysilane, and bis(perhydroisoquinolino)dimethoxysilane; and
   (ii) a second alkoxysilane that is an ethoxysilane selected from the group consisting of ethyltriethoxysilane, n-propyltriethoxysilane, diisobutyldiethoxysilane, methylcyclohexyldiethoxysilane, and tetraethoxysilane; and (B) an activity limiting agent (ALA) comprising an alkyl ester of $C_4$-$C_{30}$ aliphatic acid;
   wherein:
   (1) the molar ratio between the dimethoxysilane to the ethoxysilane in the SCA mixture is from 9:1 to 1:9;
   (2) the SCA includes 60-97 mole percent of ALA and 3-40 mole percent mixed silane composition;
   (3) the catalyst composition having a normalized activity ratio $A_{115}/A_{67}$ from 1% to 5%, wherein the normalized activity ratio is defined as $A_{ii5}/A_{67}$, where $A_{15}$ is the activity at temperature 115° C. and $A_{67}$ is the activity at 67° C.;
   (4) a molar ratio of aluminum to total moles of SCA comprising the mixture of the mixed sane composition and the ALA is from 0.5:1 to 4:1; and
   (5) wherein a molar ratio of aluminum to Ti is 35-50.

2. The catalyst composition of claim 1 wherein the first alkoxysilane is diisopropyldimethoxysilane and the second alkoxysilane is tetraethoxysilane.

3. The catalyst composition of claim 1 wherein the first alkoxysilane is dicyclopentyldimethoxysilane and the second alkoxysilane is tetraethoxysilane.

4. The catalyst composition of claim 1 wherein the first alkoxysilane is bis(perhydroisoquinolino)dimethoxysilane and the second alkoxysilane is n-propyltriethoxysilane.

5. The catalyst composition of claim 1 wherein the first alkoxysilane is dicyclopentyldimethoxysilane, the second alkoxysilane is n-propyltriethoxysilane, and the ALA is isopropyl myristate.

6. The catalyst composition of claim 1, wherein the ALA comprises isopropyl myristate.

7. The catalyst composition of claim 1, wherein a molar ratio of aluminum to ALA is 0.5-6.7.

8. The catalyst composition of claim 1, wherein a molar ratio of aluminum to the mixed silane composition is 1.25-80.

9. The catalyst composition of claim 1, wherein a molar ratio of aluminum to total SCA is 0.5-4.

* * * * *